US008050988B2

(12) United States Patent
Kershner et al.

(10) Patent No.: US 8,050,988 B2
(45) Date of Patent: *Nov. 1, 2011

(54) METHOD AND SYSTEM OF GENERATING AUDIT PROCEDURES AND FORMS

(75) Inventors: Marriette L. Kershner, Arlington, TX (US); Kathie Knapp, Dexter, MI (US)

(73) Assignee: Thomson Reuters Global Resources, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 12/004,827

(22) Filed: Dec. 21, 2007

(65) Prior Publication Data
US 2009/0112741 A1 Apr. 30, 2009

Related U.S. Application Data

(63) Continuation-in-part of application No. 11/977,288, filed on Oct. 24, 2007.

(51) Int. Cl.
*G07B 17/00* (2006.01)
*G07F 19/00* (2006.01)
*G07F 17/22* (2006.01)
(52) U.S. Cl. .................... 705/31; 705/7.38; 705/30
(58) Field of Classification Search ............... 705/1, 30, 705/31, 8, 7.38; 714/25; 702/108, 181; 706/47; 707/1, 100, 101, 102, 200, 3, 999.2, E17.008, 707/770; 715/713, 810, 854, 205
See application file for complete search history.

(56) References Cited

U.S. PATENT DOCUMENTS
6,009,442 A * 12/1999 Chen et al. .................... 715/205
(Continued)

FOREIGN PATENT DOCUMENTS
WO WO95/08810 * 3/1995

OTHER PUBLICATIONS
Wright, Gregory Allen, Auditing system, PCT/AU94/00559 or WO 95/08810, Mar. 30, 1995.*

(Continued)

*Primary Examiner* — Matthew Gart
*Assistant Examiner* — Olusegun Goyea
(74) *Attorney, Agent, or Firm* — Valenti Hanley & Robinson, PLLC; Kevin T. Duncan

(57) ABSTRACT

The present invention provides a computer-implemented method for automatically generating and placing documents associated with a tax and accounting related engagement, for example assessing risks associated with an audit. A user is presented with a plurality of audit items and a set of risk levels associated with the audit items and may also be presented with a plurality of prompts designed to elicit a set of responses from the user. The set of user responses being associated with a set of risks associated with the audit. The set of risk levels being associated with a set of assertions associated with the audit items and may include first and second risk levels of different degrees. The method further includes processing a set of responses received from the user in response to the items presented. The method includes automatically generating a suggested audit approach that is based at least in part on the processed responses. The method further includes automatically generating documents associated with the suggested audit approach and placing the automatically generated documents within a predefined set of folders. The method may also determine a set of procedures that are based on the responses. The set of procedures are presented to the user based on the suggested audit approach.

20 Claims, 24 Drawing Sheets

U.S. PATENT DOCUMENTS

| | | | | |
|---|---|---|---|---|
| 6,810,404 | B1* | 10/2004 | Ferguson et al. | 1/1 |
| 6,820,094 | B1* | 11/2004 | Ferguson et al. | 1/1 |
| 7,137,099 | B2* | 11/2006 | Knight et al. | 717/100 |
| 7,158,962 | B2* | 1/2007 | Nelson | 707/737 |
| 7,359,897 | B2* | 4/2008 | Singh et al. | 707/770 |
| 7,523,053 | B2* | 4/2009 | Pudhukottai et al. | 705/30 |
| 2004/0103102 | A1* | 5/2004 | Nelson | 707/100 |
| 2004/0260591 | A1* | 12/2004 | King | 705/8 |
| 2004/0260628 | A1* | 12/2004 | Minton et al. | 705/30 |
| 2005/0060382 | A1* | 3/2005 | Spector et al. | 709/213 |
| 2005/0091184 | A1* | 4/2005 | Seshadri et al. | 707/1 |
| 2005/0091674 | A1* | 4/2005 | Knight et al. | 719/332 |
| 2005/0166139 | A1* | 7/2005 | Pittman et al. | 715/511 |
| 2006/0015482 | A1* | 1/2006 | Beyer et al. | 707/3 |
| 2006/0074980 | A1* | 4/2006 | Sarkar | 707/104.1 |
| 2006/0106686 | A1* | 5/2006 | King et al. | 705/30 |
| 2006/0241991 | A1* | 10/2006 | Pudhukottai et al. | 705/8 |
| 2006/0242604 | A1* | 10/2006 | Wong et al. | 715/854 |
| 2006/0277160 | A1* | 12/2006 | Singh et al. | 707/3 |
| 2007/0136622 | A1* | 6/2007 | Price et al. | 714/25 |
| 2007/0156495 | A1* | 7/2007 | King | 705/8 |
| 2007/0179742 | A1* | 8/2007 | Tabanou et al. | 702/181 |
| 2007/0233508 | A1* | 10/2007 | Gillespie | 705/1 |
| 2008/0033969 | A1* | 2/2008 | Koo et al. | 707/100 |
| 2008/0052623 | A1* | 2/2008 | Gutfleisch | 715/713 |
| 2008/0154609 | A1* | 6/2008 | Wasserblat et al. | 704/273 |
| 2008/0154866 | A1* | 6/2008 | Beyer et al. | 707/3 |
| 2008/0281768 | A1* | 11/2008 | Sadeh | 706/47 |
| 2009/0157627 | A1* | 6/2009 | Arthursson | 707/3 |

OTHER PUBLICATIONS

Paul J Wendell. (Jul. 2007). PCAOB Issues New AS 5 on Internal Control. SEC Accounting Report, 33(8), 5-6. Retrieved Jun. 17, 2011, from Accounting & Tax Periodicals.*

* cited by examiner

FIGURE 3

Engagement Setup 3 of 3

Select the audit areas you wish to include in the engagement

| Audit Area | Include? |
|---|---|
| Cash | ☒ |
| Accounts Receivable and Sales | ☒ |
| Inventory and Cost of Sales | ☒ |
| Inventory Observation | ☒ |
| Property | ☒ |
| Investments and Derivatives | ☒ |
| Other Assets | ☒ |
| Accounts Payable and Other Liabilities | ☒ |
| Notes Payable and Long-term Debt | ☒ |
| Income Taxes | ☒ |
| Equity | ☒ |
| Income and Expenses | ☒ |

Add Audit Area

< Previous | Finish | Cancel

Identified Risk

Describe Risk:

Is this a fraud risk? ○ Yes  ● No

Is this a significant risk that requires special audit consideration? ○ Yes  ● No Select the audit areas affected by the risk or, if the risk affects the financial statement in general, select Overall Financial Statements:

- ☐ Cash
- ☐ Accounts Receivable and Sales
- ☐ Inventory and Cost of Sales
- ☐ Property
- ☐ Investments and Derivatives
- ☐ Other Assets
- ☐ Accounts Payable and Other Liabilities
- ☐ Notes Payable and Long-term Debt
- ☐ Income Taxes
- ☐ Equity
- ☐ Income and Ex...

Or

- ☐ Overall Financial Statements

[ Next > ]  [ Cancel ]

Diagnostics Report

1. The following Planning Forms contain questions that have not been answered:

CX-1.1 - Engagement Acceptance Form
   Questions 1.b, 1.c, 1.d, 1.e, 2, 3, 4.a, 4.b, 4.c, 4.d, 4.e, 4.f, 4.g, 4.h, 4.i, 4.j, 5.a, 5.b, 5.c, 5.d, 6, 7.a, 7.b.(1), 7.b.(2), 7.b.(3), 7.c.(1), 7.c.(2), 7.c.(3), 7.c.(4), 7.c.(5), 7.d, 7.d.(1), 7.d.(2), 7.e, 7.f, 7.g, 8 and 9

CX-3.1 - Understanding the Entity and Its Environment
   Questions 1, 2, 3, 4, 5, 6, 8, 9, 10, 11, 12, 13, 14, 15, 16, 17, 18, 19, 20, 21, 22, 23, 25, 26, 27, 28, 29, 31, 32 and 1

CX-3.3 - Fraud Risk Inquiries Form
   Questions 1.h, 2, 3.d and 4.c

CX-4.1 - Understanding the Design and Implementation of Internal Control
   Questions 1, 2, 3, 4, 5, 12, 13.a, 13.b, 14, 15, 16, 17, 19 and 20

CX-5.1 - Risk Identification Form
   Questions 1, 2, 3, 4, 5, 6, 7, 8, 9, 10, 11, 12, 13, 14, 15, 16 and 17

2. An Audit Approach has not been selected for:

Cash
   Accounts Receivable and Sales
   Inventory and Cost of Sales
   Property
   Investments and Derivatives
   Other Assets
   Accounts Payable and Other Liabilities
   Notes Payable and Long-term Debt

FIGURE 17

CX-3.3: Fraud Risk Inquiries Form

Entity: ☐
Completed by: ☐

Balance Sheet Date: ☐
Date: ☐

Instructions: The purpose of this form is to document the auditor's inquiries of management and others about fraud risks. Inquiries should be made of management, other employees, and (if applicable) internal auditors and the audit committee. Use professional judgment to determine which members of management and employees to interview, the extent of inquiries, and whether it is necessary to obtain corroborating information. A list of required inquiries is provided for each step on the form to ensure that all professional requirements are met. It is not necessary to repeat this list when documenting the inquiries; rather, document the primary areas of focus during the interview, the responses to the inquiries, and the related risks. Fraud inquiries may occur prior to, or in conjunction with, other risk assessment procedures, but should take place each year. Information gathered about potential risks or any identified risk should be considered at or carried forward to the "Risk Identification Form" () or the "Risk Assessment Summary Form" ().

1. Inquire of management personnel or the owner/manager about the risks of fraud and how the entity addresses them. Specifically ask about the following:
   a. Their knowledge of any actual fraud or suspicions of fraud affecting the entity.
   b. Their awareness of any allegations of fraud or suspected fraud affecting the entity.
   c. Their understanding of the risks of fraud within the entity, including any specific fraud risks the entity has identified or account balances or transaction classes that may be susceptible to fraud.
   d. How they communicate to employees the importance of ethical behavior and appropriate business practices.
   e. Programs and controls the entity has implemented to address identified fraud risks, or otherwise help prevent

FIGURE 19

METHOD AND SYSTEM OF GENERATING AUDIT PROCEDURES AND FORMS

CROSS-REFERENCE TO RELATED APPLICATIONS

This application is a continuation-in-part of application Ser. No. 11/977,288, filed Oct. 24, 2007, for a Method and System of Generating Audit Procedures and Forms, which is incorporated herein by reference.

FIELD OF THE INVENTION

The present invention relates to the provision of and tools to assist in the provision of professional services, specifically including auditing services. More particularly, the present invention relates to computer-implemented tools, resources, and processes for conducting audits.

BACKGROUND OF THE INVENTION

As companies continue to strive for efficiency, consistency and flexibility, computers and software executed on computers are increasingly relied upon to automate, semi-automate, enhance, quicken and make reliable and uniform business processes. This is true even in fields of professional service providers, such as financial auditors, and fields in which standardized procedures and documents govern acceptable and "best" practices. For instance, organizations, such as FASAB (Federal Accounting Standards Advisory Board), FASB (Financial Accounting Standards Board), AICPA (American Institute of Certified Public Accountants), IASB (International Accounting Standards Board), the SEC, and PCAOB (Public Company Accounting Oversight Board) promulgate rules and regulations, e.g., GAAS (generally accepted auditing standards), GAAP (generally accepted accounting principles), and IFRS (International Financial Reporting Standards), that govern the way companies are reviewed for integrity of financial accounting and operation. GAAS is principally comprised of ten auditing standards developed by AICPA that establish general standards (3) and standards related to field work (3) and reporting (4), including whether the report is in accordance with GAAP, and related interpretations.

In the field of auditing, although GAAP and GAAS provide guidelines by which auditors should conduct audits, there is a significant amount of leeway and many variables that leave to the professional and his or her assessments determining the set of procedures required under the particular set of circumstances. This may also depend on the purpose and the intended audience to receive and interpret/rely on the report, and whether the entity being audited is public or non-public or governmental. Whether public or non-public, investors, banks, and other persons of interest rely on financial accounting information when determining whether to invest in a company, grant a loan to a company, merge with a company, etc. Standards are intended to promote best practices and uniformity, and therefore reliability, in the auditing process so that the resulting report may be viewed as unbiased, accurate and trustworthy.

Companies, such as Thomson Corporation, provide tools, resources and services to assist accountants and auditors. For instance, Thomson PPC's e-Practice Aids is a series of titles or Guides that give guidance and provide materials and procedures consistent with standards, e.g., *PPC's Guide To Audit Of Nonpublic Companies,* 25*th* Edition, January 2007. Auditors may rely on the Guides or titles in conducting audits. Electronic tools, for instance Thomson's e-Tools, and electronic versions of guides, Thomson e-Practice Aids, help auditors take their tools and resources With them when conducting field work or may make them accessible from remote locations or at least electronically. Computers are also helpful in collecting client data and capturing assessment data. What is needed is an integrated system for conducting audits and for processing collected and risk related assessment data to determine and generate and present a suggested audit approach and set of procedures consistent with relevant standards and guides, then generating documents containing those procedures and providing the auditor with quick access to such documents for use in an audit and a structure for efficient document storing and handling.

SUMMARY OF THE INVENTION

The present invention addresses the shortcomings of the prior art and provides, among other things, a powerful computer-implemented tool to assist in making risk assessments and for generating procedures, conducting audits, and coordinating documents and other work product in assessing risks associated with business processes and operations. More particularly, the present invention relates to a system of creating and generating auditing procedures in response to identified risks and risk assessments. The present invention comprises a logic scheme wherein an auditor is prompted with a series of questions or prompts for information and the answers or responses given by the auditor are used as input to the logic sequence in determining the procedures the auditor will use when performing the audit. The present invention may be used by auditors in performing audits of non-public as well as public companies, governmental organizations, and other entities and typically involves the generation of work product capturing or summarizing the effort and underlying basis for opinions associated with the effort.

In one respect, the invention provides a professional services audit tool that includes an application that performs a variety of functions such as completing certain audit planning processes/forms (including assessing risks related to the financial statements being audited), offering a tailored set audit programs based on the assessed risks, allowing users to further tailor the suggested audit programs, and rendering theses audit programs in a helpful format, e.g., Thomson Corporation's PPC SMART e-Practice Aids format. In one manner, to use the application, each user also must own and have a valid license installed of an associated practice aid product or suite, e.g., Thomson's e-Practice Aid product. In this example, the e-Practice Aid corresponds to one of a set of audit types or titles.

The present invention includes one or more of the following advantages whereby users may: complete audit planning documentation; identify and capture audit risks affecting your engagement; select an audit strategy in response to the user's risk assessment; automatically generate suggested audit programs and procedures; efficiently customize using GUI drag and drop functionality; produce tailored practice aids for the particular engagement such as in performing an audit; automate the audit planning and risk assessment process; optimize the user's professional audit judgment; improve linkage between audit risk and procedures performed; increase audit effectiveness and reduce risk; and increase consistency across audit engagements.

One further benefit of the present invention is that an auditor can be sure to include all relevant information in the audit procedures without sacrificing detail. The prompt-response method of the present invention directs the auditor to consider piecemeal whether each individual component of the possible audit procedures should be included. By doing this, the audit procedures will be far clearer and less confusing to both the auditor and the audited parties.

The auditor as described in the present invention is intended to include every person who may use the program to assess risk facing an enterprise. The applications in the context of auditing cover, for example, the following categories: accounting, audit & attest; compilation and review; non-profit organizations; governments; specialized industries; and bookkeeping services.

Once the auditor has responded to certain prompts, a series of tailored audit procedures will be created corresponding to each audit area the auditor has selected. Audit areas are intended to include cash, accounts receivables and sales, inventory and costs of sales, inventory observation, property, investments and derivatives, other assets, accounts payable and other liabilities, notes payable and long-term debt, income taxes, equity, and incomes and expenses.

The above-mentioned audit procedures are created using a logic system based primarily on the input of assertions associated with Risk of Material Misstatement (RMM), but include such other facts as fraud risks. In one manner, when one or more or a particular combination of assertions are evaluated to be "high," one or more extended procedures will be suggested when creating or generating the audit procedures. The extended procedures suggested will relate particularly to that area or assertion that is deemed to be a high risk. If no high risks are involved with the particular audit, then the "Basic" approach will be suggested. An exception exists where the risk is moderate and there is a risk of fraud or other significant risk. In such instances, an Extended approach will be suggested for that assertion.

The term "assertion" as used herein means representations that are embodied in components being audited.

Areas of the generated audit procedures will be filled in by information inputted during the engagement process and planning forms of FIGS. 2-13(*j*). Content is placed in particular places within the generated document using the bookmarks and cross-reference feature of Microsoft Word from the Microsoft Office. Forms tailored by variable data input are known as "smart" forms. Exemplary technology that may be used to accomplish the "on the fly" creation of documents includes one or more of XML, Microsoft WORD object model and WORD templates.

The present invention is intended to be medium-neutral, being equally capable as a desktop program, a web-enabled program, a web-based program, and any variation thereof, being broad enough to include all future mediums.

In one embodiment the present invention provides a system for assessing risks associated with an audit. The system comprises: a computer having an associated memory, display, and input device and adapted to execute code; a graphical user interface adapted to operate on the computer and adapted to present a plurality of audit items and a set of risk levels associated with the plurality of audit items and adapted to receive a set of responses by the input device; a response code set adapted to be executed on the computer and adapted to process the set of responses; and an audit code set adapted to be executed by the computer and adapted to automatically generate a suggested audit approach based at least in part on the set of responses. In addition, the graphical user interface may be adapted to present a set of prompts designed to elicit the set of responses, the set of responses being associated with a set of risks associated with the audit. Further, the audit code set may be further adapted to present by the graphical user interface a set of procedures based at least in part on the suggested audit approach. Also, the responses may represent a set of assertions of risk level associated with the plurality of audit items.

The system may further comprise a selection code set adapted to provide selection of a set of at least two audit approaches comprising the suggested audit approach and an alternative audit approach. The suggested audit approach may be either basic or extended, for example. The set of risk levels may comprise a first risk level, a second risk level, and a third risk level. Also, in the system each response in the set of responses may be a selected risk level from the set of risk levels and wherein the first risk level is low, the second risk level is moderate, and the third risk level is high. The graphical user interface may be further adapted to present an electronic audit form associated with an audit and the electronic form may comprise the plurality of audit items and possible risk levels. The audit code set may be further adapted to determine a set of procedures based at least in part on the set of responses. The audit code set may be further adapted to present a set of electronic documents associated with the suggested audit approach.

In another embodiment the invention provides a computer-implemented method or process for assessing risks associated with an audit. The process includes the step of presenting to a user a plurality of audit items and a set of risk levels associated with the plurality of audit items. The presenting step may further comprise presenting a plurality of prompts designed to elicit a set of responses from a user/auditor wherein the set of user responses are associated with a set of risks associated with the audit. Further, the set of risk levels may be associated with a set of assertions associated with the plurality of audit items. Also, the set of risk levels may include at least a first risk level and a second risk level of different degrees of risk. The method further includes the step of processing a set of responses received from the user in response to the items presented. The method includes the step of automatically generating a suggested audit approach that is based at least in part on the processing step.

In addition, the exemplary method may include the following steps. The step of determining a set of procedures that are based at least in part on the responses from the response processing step. An additional step involves presenting the set of procedures to the user based at least in part on the suggested audit approach. The method may also include the step of presenting the user with a set of at least two audit approaches comprising the suggested audit approach and an alternative audit approach from which the user may select. The suggested audit approach may be one of basic, limited or extended. In the method, each response in the set of responses may be a selected risk level from the set of risk levels representing different levels of risk. The presenting step may include presenting an electronic audit form associated with the audit being performed by the user. The electronic form may comprise the plurality of audit items and the set of risk levels. The automatically generating step may further include determining a set of procedures based at least in part on the set of user responses and the suggested audit approach may include presenting the set of procedures.

The method may also include the step of editing the determined set of procedures from the generating step to result in a customized set of procedures. The method may also include the step of presenting a set of electronic documents associated with the suggested audit approach.

The system may be configured and the method may be performed in a variety and combination of environments and architectures, including Internet/WWW-based applications, desktop applications, and WWW-enabled applications. In one exemplary architecture, a user at a remote workstation may have executing thereon software so that the user is not writing back to the central server database until the user chooses to save changes made. Until the changes are saved, the user is working in short-term memory and the user has the ability to perform "what if" scenarios.

The present invention builds on existing practice aids to provide an integrated audit planning and risk assessment approach to engagements. The invention provides an audit tool that allows auditors to complete audit planning documentation, identify and capture audit risks affecting the engagement, automatically generate suggested audit programs, select from suggested and alternative audit strategies responsive to auditor risk assessment, customize audit program aspects with user-friendly GUI and drag and drop functionality, and produce tailored practice aids for the engagement. To a large extent the present invention may be used to automate the audit planning and risk assessment process, optimize judgments, improve linkage between audit risk and procedures performed, increase audit effectiveness and reduce risk, and increase consistency across audit engagements. These and other objects and benefits of the present invention are made more apparent with the aid of the following description and figures.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 3 depicts a screen shot illustrating exemplary functionality for use in conjunction with the present invention;

FIG. 5 depicts an exemplary screen for selecting audit areas related to a particular engagement;

FIG. 6 depicts an Engagement Acceptance Form and related screen for use in a client assessment aspect of the present invention;

FIG. 7 depicts a risk identification screen where an auditor may enter and describe a type of risk in keeping with the present invention;

FIG. 8 depicts an Understanding the Entity and its Environment screen used in gathering audit related data;

FIG. 9 depicts an Engagement Team Discussion form and related screen in keeping with the present invention;

FIG. 10 depicts the Fraud Risk Inquiries Form and related screen in keeping with the present invention;

FIG. 11 depicts the Understanding the Design and implementation of Internal Control form and related screen in keeping with the present invention;

FIG. 12 depicts the Risk Identification Form and related screen in keeping with the present invention;

FIG. 13 depicts an exemplary audit area Risk Assessment Summary Form and related screen in keeping with the present invention;

FIG. 15 depicts a screen shot illustrating the procedures generated by inputted data related to one of the audit area audit programs;

FIG. 16 depicts a screen illustrating procedures for performing an audit report;

FIG. 17 depicts a diagnostic report and related screen in keeping with the present invention;

FIG. 19 depicts a preview of an audit form generated by software of the present invention;

DETAILED DESCRIPTION OF THE PREFERRED EMBODIMENT

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In one respect, the invention provides a professional services audit tool that includes an application that performs a variety of functions such as completing certain audit planning processes/forms (including assessing risks related to the financial statements being audited), offering a tailored set of audit programs based on the assessed risks, allowing users to further tailor the suggested audit programs, and rendering these audit programs in a helpful format, e.g., Thomson Corporation's PPC SMART e-Practice Aids format. In one manner, to use the application, each user also must own and have a valid license installed of an associated "practice aid," e.g., Thomson's e-Practice Aid product. In this example, the practice aid corresponds to one of eleven audit types, also referred to herein as "titles." An exemplary list of audit types or titles that are supported by the Risk Assessment system of the present invention includes: Guide to Audits of Nonpublic Companies; Guide to PCAOB Audits (i.e., audits of publicly-traded companies); Guide to Audits of Nonprofit Organizations; Guide to Audits of Local Governments; Guide to Audits of Employee Benefit Plans; Guide to Construction Contractors; Guide to Dealerships; Guide to Audits of Financial Institutions; Guide to Homeowners' Associations and Other Common Interest Realty Associations; Guide to HUD Audits; and Guide to Single Audits (audits that comply with government and non-profit "single audit" rules, regulations and guidelines). One advantage of this embodiment of the invention is that it enables a user to obtain a greater understanding of the entity under audit or review and its environment, review internal control, perform a more rigorous risk assessment, provide linkage of assessed risks of material misstatement (RIMM) to the user's audit procedures at the assertion level, and meet new and expanded documentation requirements.

Figure 1:
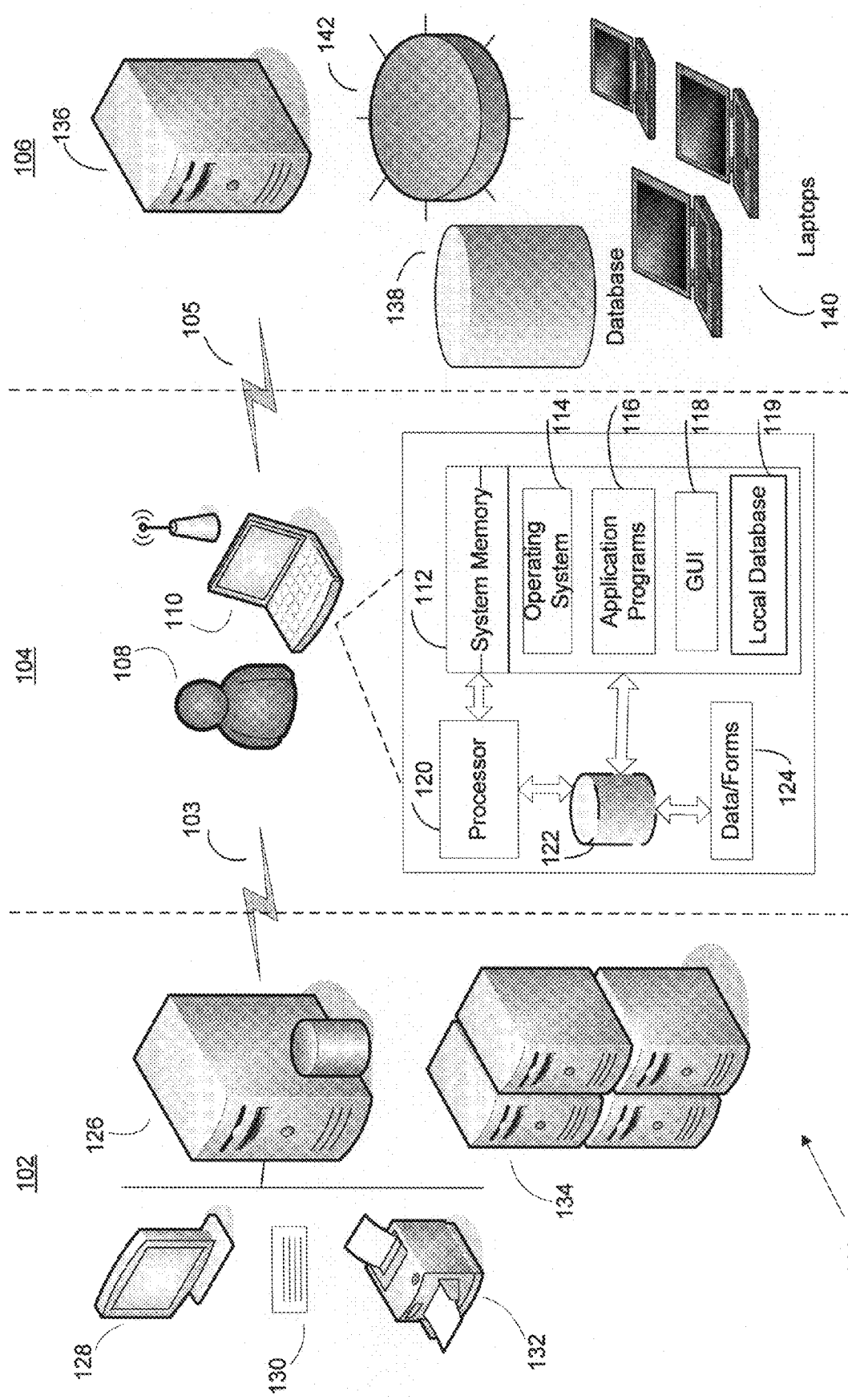
FIG. 1 depicts an exemplary system embodiment of the present invention.

Referring now to FIG. 1, a system 100 is shown for implementing a risk assessment and audit program and providing a tool that creates and generates audit procedures based on risk assessments and assertions identified during an audit. The system 100 comprises a central side 102, a remote audit work station 104 and a local client-side facility 106. In this example, a user 108, such as a professional conducting an audit, may use a mobile or local device, such as a wireless-enabled notebook computer 110 to connect to the central side 102 and/or the client side 106 via communication links. This configuration is one of many and is not limiting as to the invention. For example, in one alternative configuration user 108 may use the application fully self-contained within a desktop environment, e.g., as shown within 104, and may utilize a local database 119, such as SQL 2005 or above or SQL Express or other suitable database. The communication links may be a combination of wireless, LAN, WLAN, ISDN, X.25, DSL, and ATM type networks, for example. The user notebook 110 may comprise a typical combination of hardware and software including system memory 112, operating system 114, application programs 116, graphical user interface (GUI) 118, processor 120, and storage 122 which may contain electronic information 124 such as forms, practice aids, titles, data, procedures and the like. The operating system 114 shall be suitable for use with the risk assessment functionality described herein, for example, Microsoft Windows Vista (business, enterprise and ultimate editions), Windows 2000 with SP4 or Windows XP Professional with SP2. Also, the risk assessment invention may be browser-based and/or may include custom integration with Microsoft Office applications, e.g., Outlook, Word and Excel. Application programs 116 may include, for example, Microsoft Office 2007, Office XP with SP2, or Office 2003 with SP1 applications. The software and related tools, procedures, forms and data used to implement the risk assessment processes may be accessed by the machine 110 via the Internet or it may be loaded onto the machine via CD-ROM or other media or a combination of such means. The system requirements in one embodiment may require the machine 110 to be compatible with minimum threshold levels of processing capabilities, e.g., Intel Pentium III, speed, e.g., 500 MHz, and other parameters.

For purposes of discussion, an exemplary central side 102 may comprise a central server and database 126, user interface peripherals such as drives (not shown) monitor 128, keyboard 130, and printer 132. The central server and database 126 may be used to communicate remotely, or locally for that matter, with the user's machine 110 and may load, pass, receive information and instructions, such as software executable on the machine 110 and data, forms, titles, guides, procedures and the like for storing and using locally by the user on machine 110. A communication link 103 may be established between central side 102 and user workstation 104 for updating data and software used by the user during auditing processes. The central side 102 may also include one or more application servers 134 and other devices to help facilitate the exchange of software and data between the user 108 and the central side 102. The central side 102 may be associated with a professional services company, such as an accounting firm, in the business of conducting audits.

The local client-side facility 106 is illustrated for exemplary purposes only as including a server 136 or the like to provide a communication link 105 between the user machine 110 and the client-side system as required, if at all, in the auditing process. The client-side facility 106 may include a network 142 of computers 140, such as over a LAN, WLAN, Ethernet, token ring, FDDI ring or other communications network infrastructure. The client-side facility may also include a database 138 or other data storage component. In conducting an audit of a company associated with facility 106, the user 108, in one optional manner, may access data and/or the network 142 as necessary to review documents and processes of the company to prepare assessments and identify risks associated with company operations. In conducting and completing the audit engagement, the user 108 inputs data, calls upon audit tools, such as titles and procedures stored locally or remotely at the central side 102.

The system 100 may be Internet or (World Wide) WEB-based, desktop-based, or application WEB-enabled. Also, the present invention supports a "disconnected use" of the software in that the software may be designed so that a user 108 does not write back to the central server database 126 and/or the local database 119 until the user chooses to "save" or store the changes. Prior to saving changes, the user 108 may work in short-term memory. This feature has the benefit of allowing the user 108 to perform "what if" scenarios and examine results of these scenarios.

Figure 2:
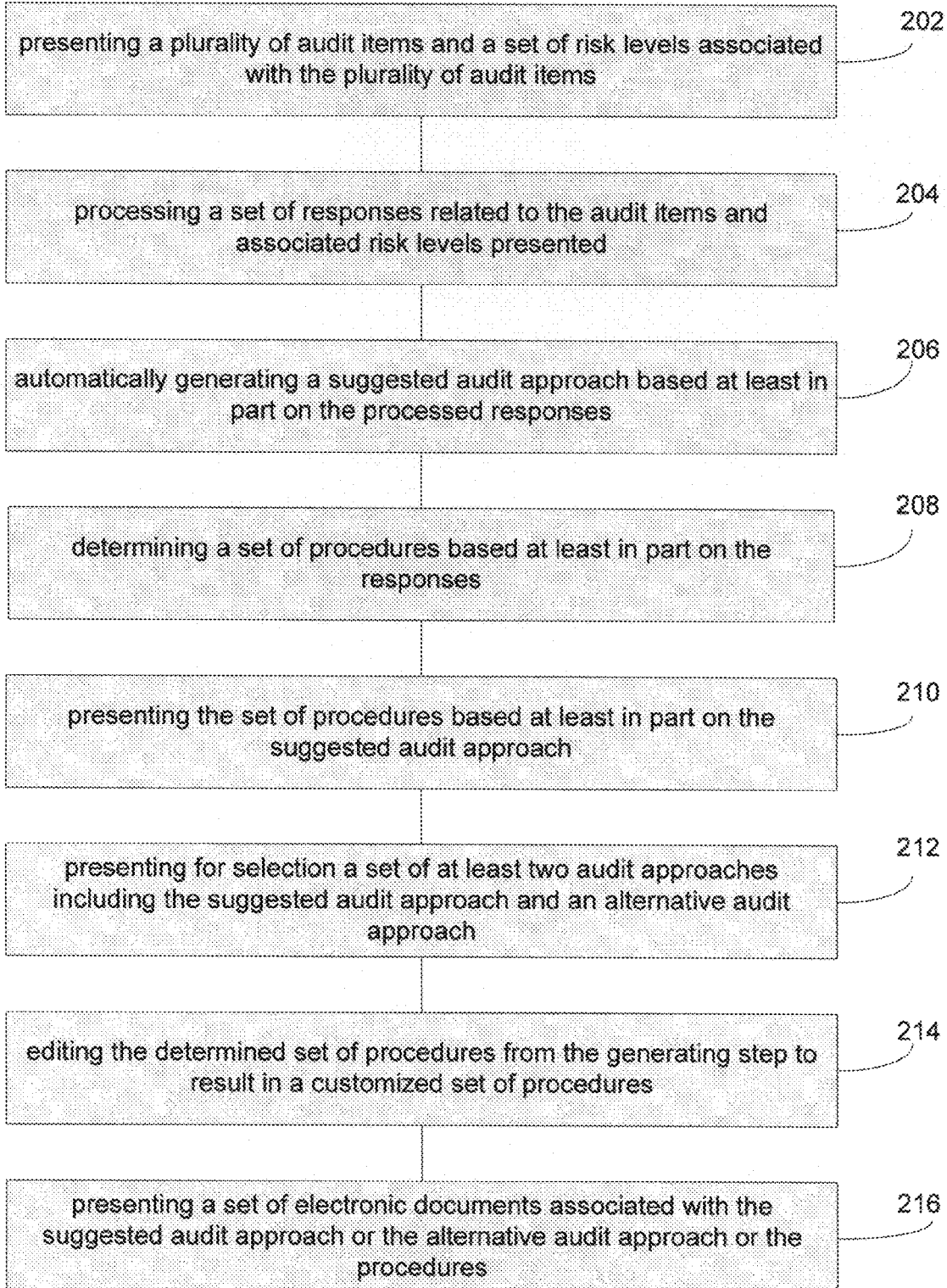
FIG. 2 depicts a flowchart illustrating one embodiment of the present invention.

FIG. 2 is a flowchart illustrating an embodiment of the invention that provides a computer-implemented process 200 for assessing risks associated with an audit. The process 200 includes the step 202 of presenting to a user a plurality of audit items and a set of risk levels associated with the plurality of audit items. Presenting step 202 may further comprise presenting a plurality of prompts designed to elicit a set of responses from a user/auditor wherein the set of user responses are associated with a set of risks associated with the audit. Further, the set of risk levels may be associated with a set of assertions associated with the plurality of audit items. Also, the set of risk levels may include at least a first risk level and a second risk level of different degrees of risk. Step 204 is processing a set of responses received from the user in response to the items presented in step 202. In step 206 the process automatically generates a suggested audit approach that is based at least in part on the processing step 204.

Still with reference to FIG. 2, the process 200 may optionally include one or more of the following steps. In step 208, the process includes determining a set of procedures that are based at least in part on the responses from step 204. At step 210, the set of procedures are presented to the user based at least in part on the suggested audit approach of step 206. The process may also include step 212 whereby a user is presented a set of at least two audit approaches comprising the suggested audit approach and an alternative audit approach from which the user may select. In addition, the suggested audit approach may be one of basic, limited or extended. In the process 200, each response in the set of responses may be a selected risk level from the set of risk levels representing different levels of risk. The presenting step 206 may include presenting an electronic audit form associated with the audit being performed by a user. The electronic form may comprise the plurality of audit items and the set of risk levels. The automatically generating step 206 may further include determining a set of procedures based at least in part on the set of user responses and the suggested audit approach may include presenting the set of procedures. The process 200 may also include step 214 of editing the determined set of procedures from the generating step 206 to result in a customized set of procedures. The process 200 may also include step 216 of presenting a set of electronic documents associated with the suggested audit approach.

The process 200 may be performed in a variety and combination of environments and architectures, including Internet/WWW-based applications, desktop applications, and WWW-enabled applications. In one exemplary architecture, a user 108 at a remote workstation 110 may have executing thereon software so that the user is not writing back to the central server database 126 until the user 108 chooses to save changes made. Until the changes are saved, the user is working in short-term memory and the user has the ability to perform "what if" scenarios.

Figure 3:
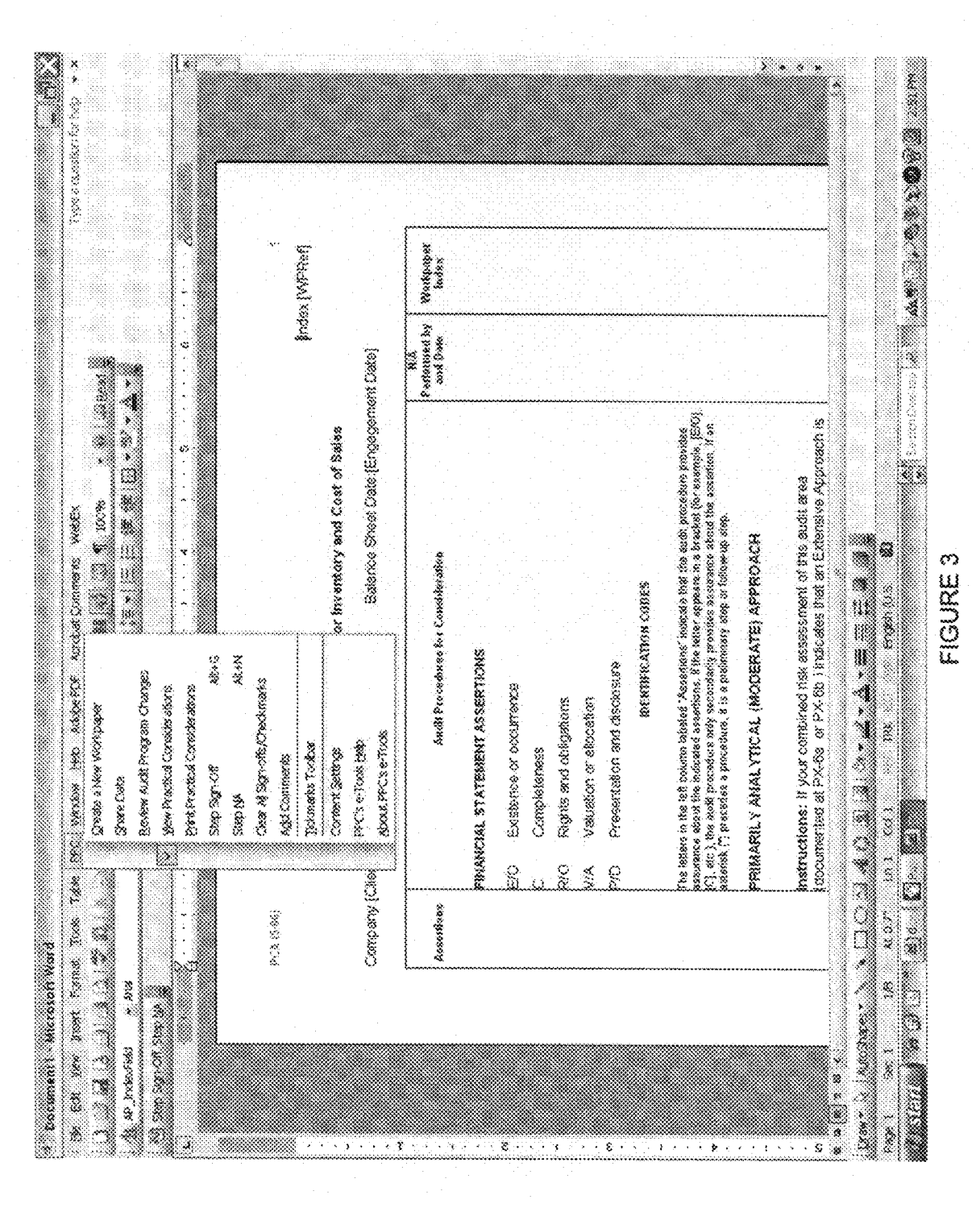

FIG. 3 is a screen shot of an exemplary practice aid comprising custom content and functionality built into the Word application. Shown is a menu representing custom audit functionality in the pull-down window with "View Practical Considerations" checked. Shown on the screen is represented the audit area "Inventory and Cost of Sales" in a practice aid form that provides direction and captures risk assessment information on Financial Statement Assertions (FSAs) and other data points.

Figure 4:
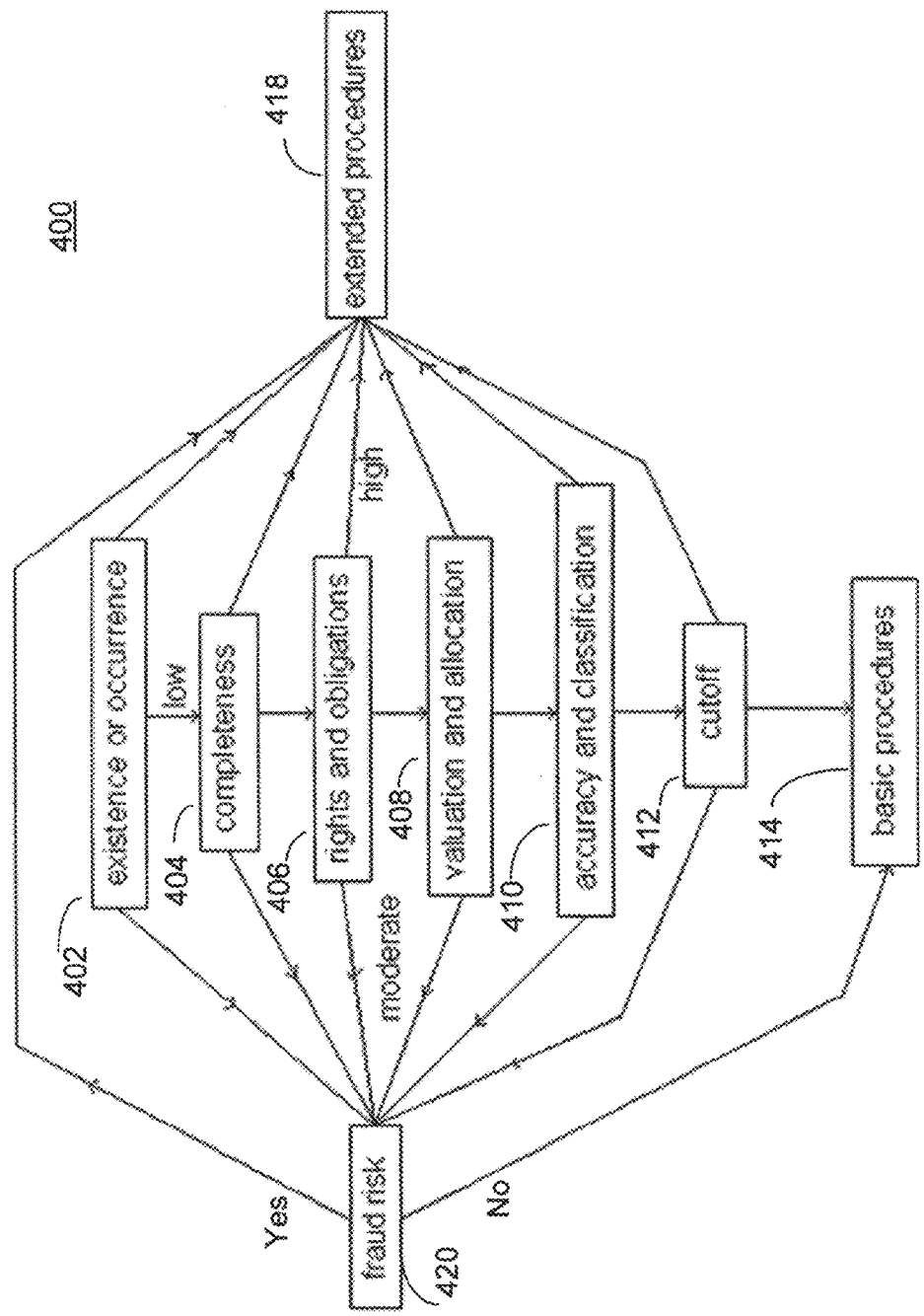
FIG. 4 depicts a flowchart illustrating a risk assessment aspect of the present invention.

FIG. 4 is a flowchart to help illustrate the logic 400 associated with assigning levels of risk associated with different assertions and how based on the assertions and assigned risk levels basic or extended procedures may be included in a suggested audit approach. Assertions 402 through 412 are similar to the FSAs of FIG. 3. For example, if all assertions 402 through 412 are assigned a low risk level then basic procedures 414 will be suggested. If some or all of assertions 402 through 412 are assigned a moderate risk level then basic procedures 414 will be suggested—unless a separate significant or fraud risk 420 assertion is indicated. Whereas, if one or more of the assertions 402 through 412 are assigned high level of risk, then extended procedures 418 may be included in the suggested audit approach. A combination of basic and extended procedures may be included in a suggested audit approach.

With regard to initiating an engagement and with reference to FIG. 1, the GUI 118 may be used to present a user 108 with an introductory screen to interface the system of creating auditing procedures in response to a field of identified risks. For example, the introductory screen may give auditors or users 108 the option to begin a new engagement or continue an existing engagement. For example, the auditor 108 may begin a new engagement by either clicking on a page icon on a command bar or going to pull-downs, e.g., "file">> "new." Once an auditor 108 begins a new engagement, GUI 118 may present the user with a subsequent screen to allow the auditor 108 to input client information. For instance, the auditor may input the client's name, a particularized name for the engagement, and an audit type or title, e.g., a Thomson e-Practice Aid Title, which may be in the form of Microsoft Word and Excel documents, checklists and templates. The risk assessment process of the present invention allows users to identify risks of material misstatement and may be integrated with professional tool applications and suites of applications, for example, Thomson Corporation's e-Tools™ Suite, including PPC's e-Practice Aids, e-Workpapers, Interactive Disclosure Libraries, and Engagement Letter Generator products. The risk assessment invention may also involve internal control processes or information and may involve assessing control risks. The risk assessment process may include a performance and reporting aspect involving evaluating acceptance and involve accessing external resources such as Hoover's reference. This may also include evaluating continuance in the context of roll-forward acceptance and continuance decisions.

For example, an auditor may select a client's name from a drop-down box where client names are presented. Alternatively, an auditor may input a new unique entry directly into the client's name data field. An audit title is selected from a list of available choices, examples of which are provided above, which includes "Audits of Nonpublic Companies." In one implementation, an auditor may be limited in the selection of practice aid titles. By limiting the number of practice aid titles, the software may be managed according to the practice aid title. An auditor determines whether the engagement is an initial audit or whether it is related to a previous audit. Managing an audit in this way is beneficial because it allows an auditor to work on an audit in stages and determines whether initial audit procedures are automatically included.

FIGS. 5 through 21 and the following text provide a more detailed description of the engagement and risk assessment process. The computer-implemented audit tool described herein allows auditors to complete audit planning documentation, identify and capture audit risks affecting the engagement, automatically and dynamically generate suggested audit programs, select from suggested and alternative audit strategies responsive to auditor risk assessment, customize audit program aspects with user-friendly GUI and drag and drop functionality, and produce tailored practice aids for the engagement. The risk assessment process also may include diagnostic capabilities to aid the auditor in identifying inconsistencies in the audit program. Additional features that may be implemented in keeping with the invention are the ability to roll-forward an engagement based on a prior period engagement and the ability to aggregate information from various tools and practice aids and implement changes to or additional risk assessment standards across an audit platform and multiple engagements. To a large extent the present invention may be used to automate the audit planning and risk assessment process, optimize judgments, improve linkage between audit risk and procedures performed, increase audit effectiveness and reduce risk, and increase consistency across audit engagements. The invention and its various features are described in more detail below.

In one embodiment of the invention, an auditor initiates an engagement and completes planning forms and identifies risks. Next the auditor assesses risks and determines audit strategies. Next, the system automatically generates an audit program and the auditor may customize the program. Next, the auditor may run diagnostics to identify inconsistencies. In more detail, after the engagement has been created or continued, as described above, FIG. 5 illustrates a screen shot presented to a user 108 of audit areas to be included in an audit for a particular engagement. FIG. 5 displays the audit areas to be included in the audit. Exemplary audit areas 30 may include cash, accounts receivables and sales, inventory and costs of sales, inventory observation, property, investments and derivatives, other assets, accounts payable and other liabilities, notes payable and long-term debt, income taxes, equity, and incomes and expenses. An auditor can choose whether each of these or other areas will be considered in an audit. Further, an auditor has the option of adding an audit area. When at least one or more of these areas are selected for inclusion in the audit, a series of questions and subsequent screens will be generated to facilitate the creation of a set of audit procedures to be completed by the auditor that are tailored to the audited entity. These audit areas act as the parameters for the audit report and will be the aspects upon which the risk assessment is calculated.

FIG. 5 shows an introductory screen for easy navigation of the audit process. It is not necessary that any stage of the process be conducted first once the engagement has been created. At all times an auditor may skip forwards and backwards in the leftmost navigation pane. The leftmost navigation pane consists of categories for the identification of risks, assessing the effects of those risks, review and modification of audit programs, and generating planning forms and audit programs. The introductory screen gives an auditor an understanding of the significance of each individual category and what the auditor is meant to accomplish in each category. The introductory screen further assists the auditor by offering a tutorial to assist the auditor in conducting the audit preparation.

Figure 6:
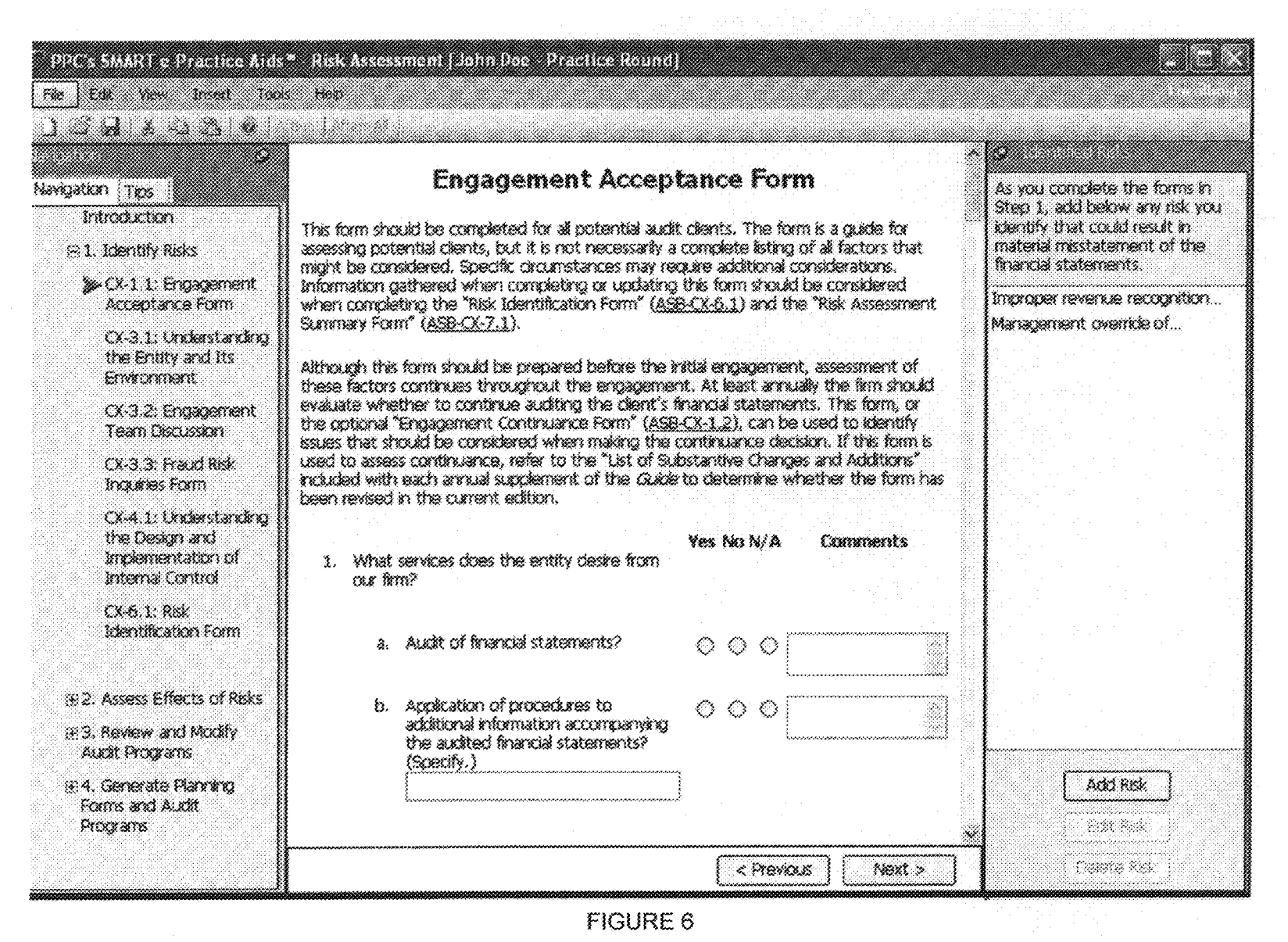

FIG. 6 depicts an engagement acceptance form screen having a navigation side pane and an identified risks side pane. This screen allows the auditor to give an initial assessment on whether they can perform the audit being requested. An auditor will input answers to questions such as the type of service being requested. Within the engagement acceptance form 60, there are practical considerations 61 identified in blue. An auditor can select to hide all practical considerations. Practical considerations consist of advice given to the auditor. The engagement acceptance form 60 also is designed for the input of brief description of the services to be performed by the auditor. Further, communications with the party seeking the audit are noted here. This screen also addresses any conflicts of interest to help ensure a professional and trustworthy report.

FIG. 6 shows a right pane where an auditor may add specific identified risks. A risk might be identified at any stage of the audit, and the completion of engagement acceptance form. Understanding the Entity and its Environment form illustrated in FIG. 8 and similar forms provide bases for the auditor to identify applicable risks. An auditor clicks the "Add Risk" box in FIG. 6, and the screen of FIG. 7 appears. FIG. 7 depicts a fraud identification screen where an auditor may enter a type of risk and describe it in any way. The auditor will determine whether this risk is a fraud-related risk and whether it is significant enough to warrant special consideration. Similar to the engagement setup of FIG. 4, the auditor selects audit areas affected by the risk, or may select "overall financial statements" if all audit areas in the financial statements will be at risk.

Figure 8:
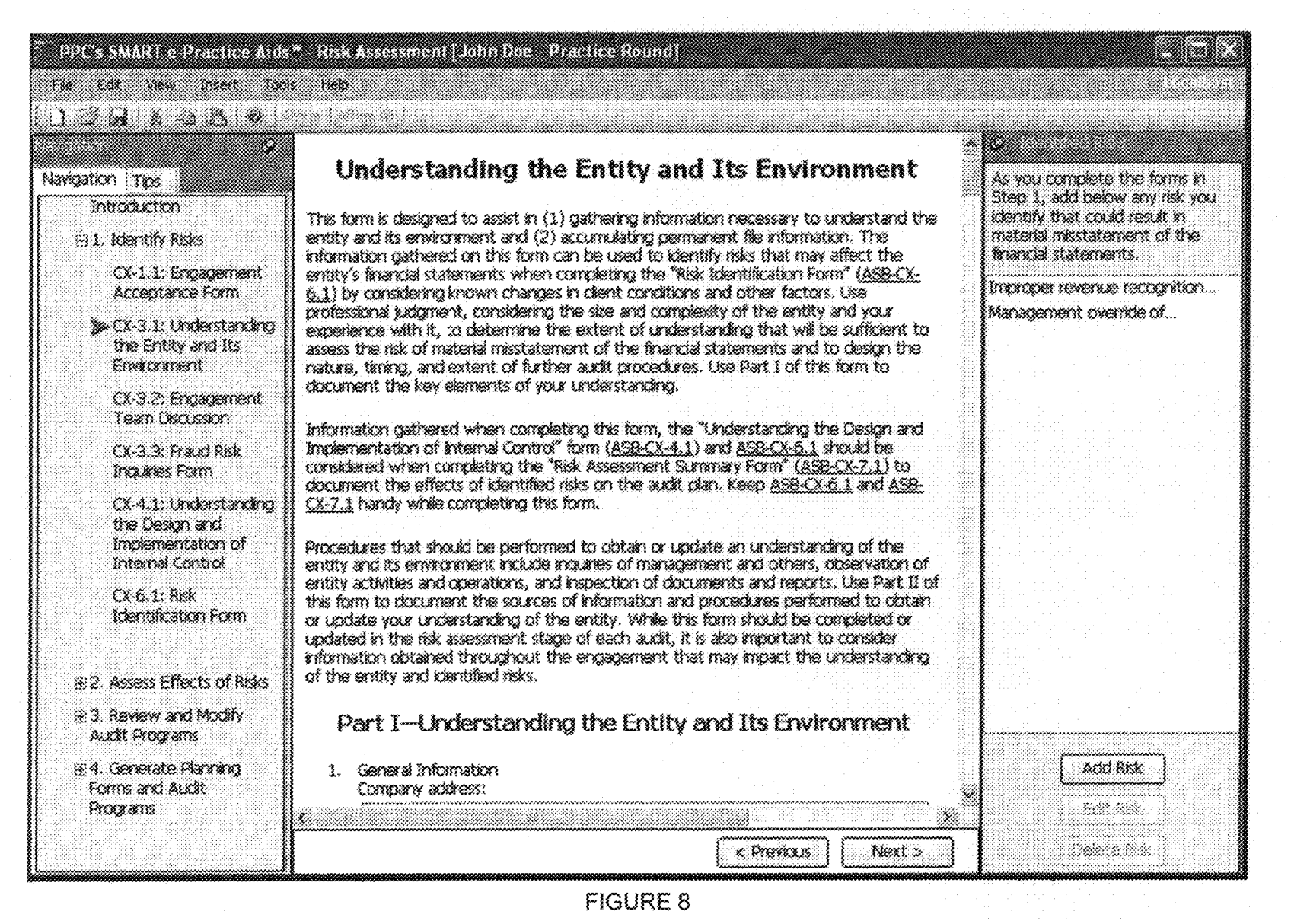

In FIG. 8, the Understanding the Entity and its Environment form and associated screen are directed to the goal of having the user better understand the entity being audited. When auditing a business, it is important that the auditor review not only the financial aspects of the business, but how the business operates and its financial plans. Here, the auditor inputs certain information about the entity being audited including their address, structure, ownership, governance. The auditor lists known transactions with related parties such as subsidiaries and other affiliated corporations. The auditor will input the type of industry in which the audited entity operates, including any applicable regulations which affect that industry. If one certain operations of the entity are being audited, the Auditor may explain what other operations the entity is engaged in.

Figure 9:
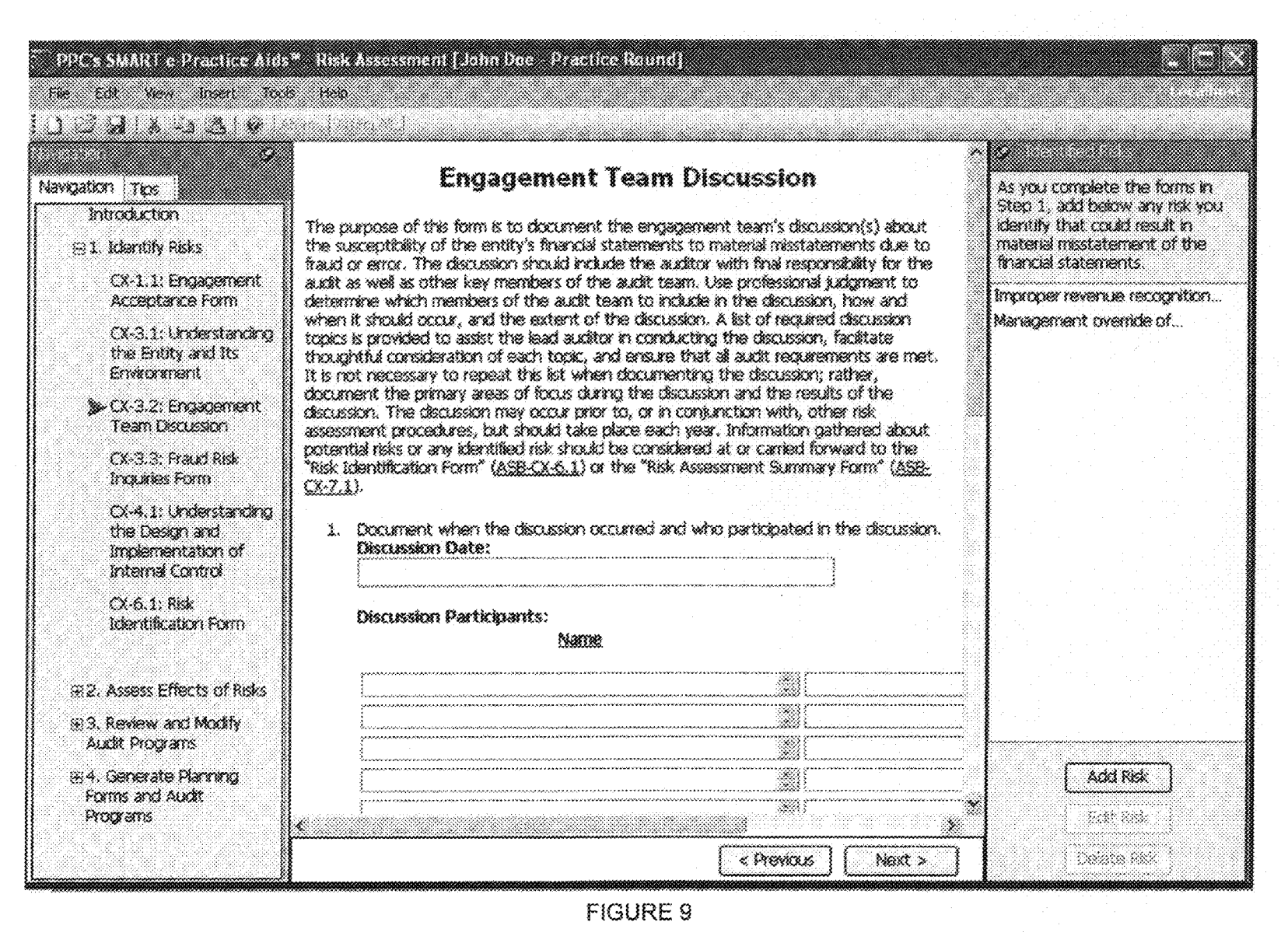

FIG. 9 depicts an Engagement Team Discussion form screen. The engagement team discussion form 80 screen allows the auditor to record the names of the persons authorized to disclose information about the entity. On this screen, the name and title of each person authorized to disclose information within this meeting would be recorded, as would all decisions resulting from this meeting.

Figure 10:
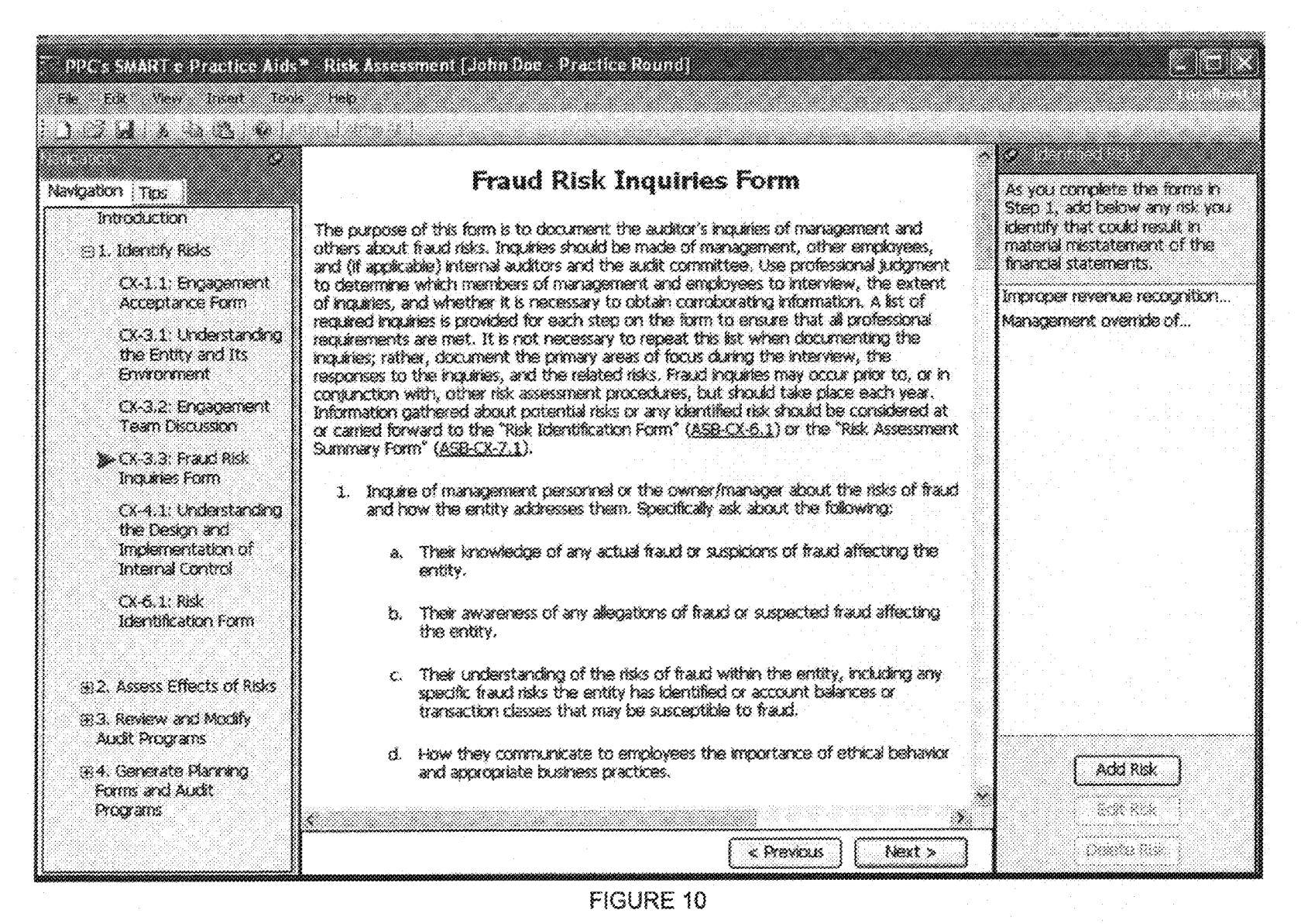

FIG. 10 depicts the Fraud Risk Inquiries Form screen. The auditor uses this screen to document the questions the auditor has asked selected employees of the entity and record their answers. This screen is for the bulk of the investigative functionality of the job of an auditor. The Fraud Risk Inquiries Form suggests questions as well as areas to consider when preparing questions.

Figure 11:
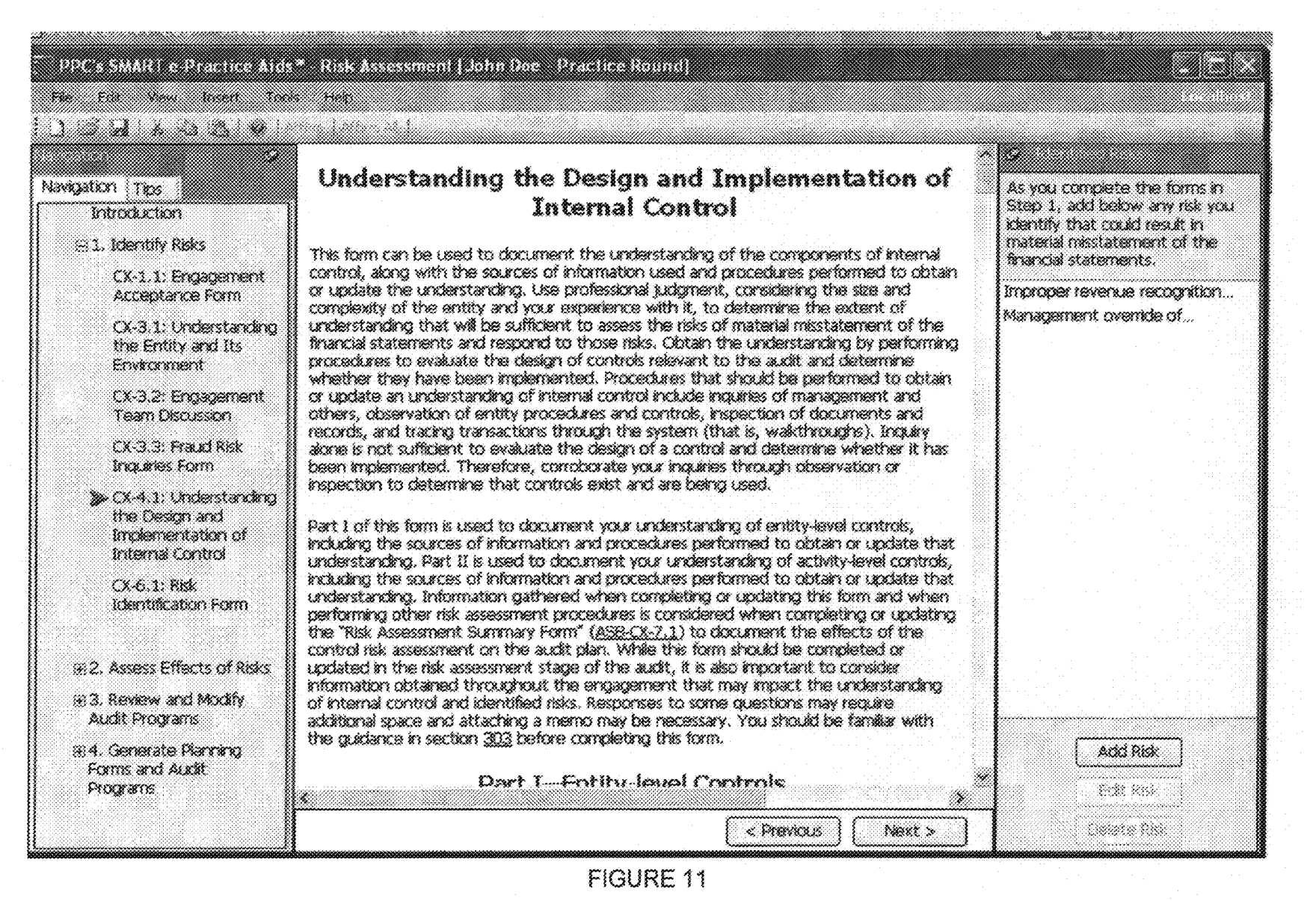

FIG. 11 depicts the "Understanding the Design and implementation of Internal Control form" screen. The auditor uses this screen to obtain a sufficient knowledge of the control environment to understand the attitudes, awareness, and actions of those governing the entity that relate to internal control and its importance in achieving reliable financial reporting and obtain a sufficient knowledge of the entity's risk assessment process to understand how management identifies business risks that may affect the financial statements and determines how to address those risks. The screen and overall system help auditors obtain a sufficient knowledge of the audited entity's internal control communication process to understand how roles, responsibilities, and significant matters related to financial reporting are communicated.

Figure 12:
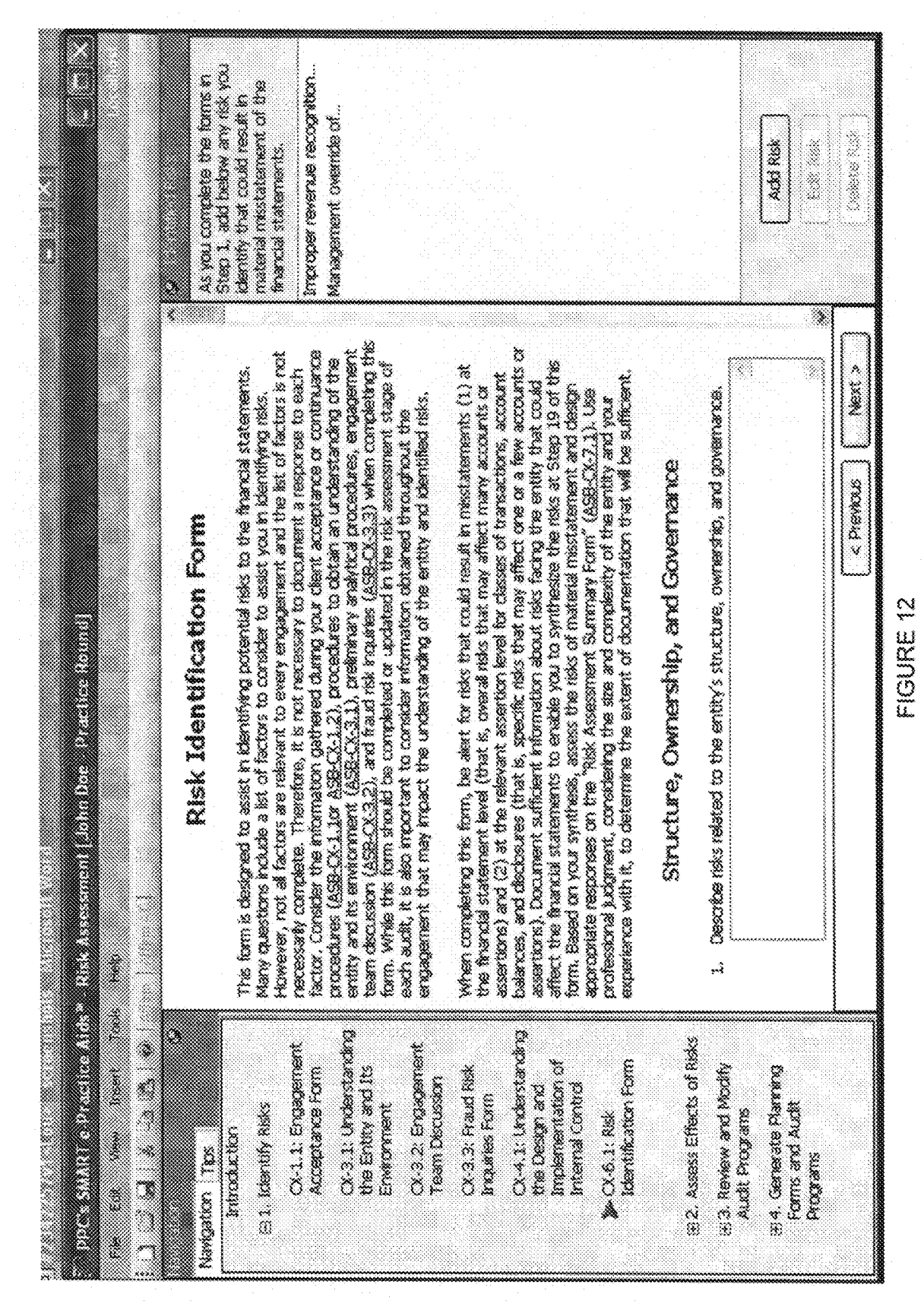

FIG. 12 depicts the "Risk Identification Form" screen. The auditor uses this form to identify potential risks in financial statements. Here, the auditor inputs risks related to the industry, the entity (including but not limited to its structure, its governance, its investment strategy), and indications of fraud.

Figure 13:
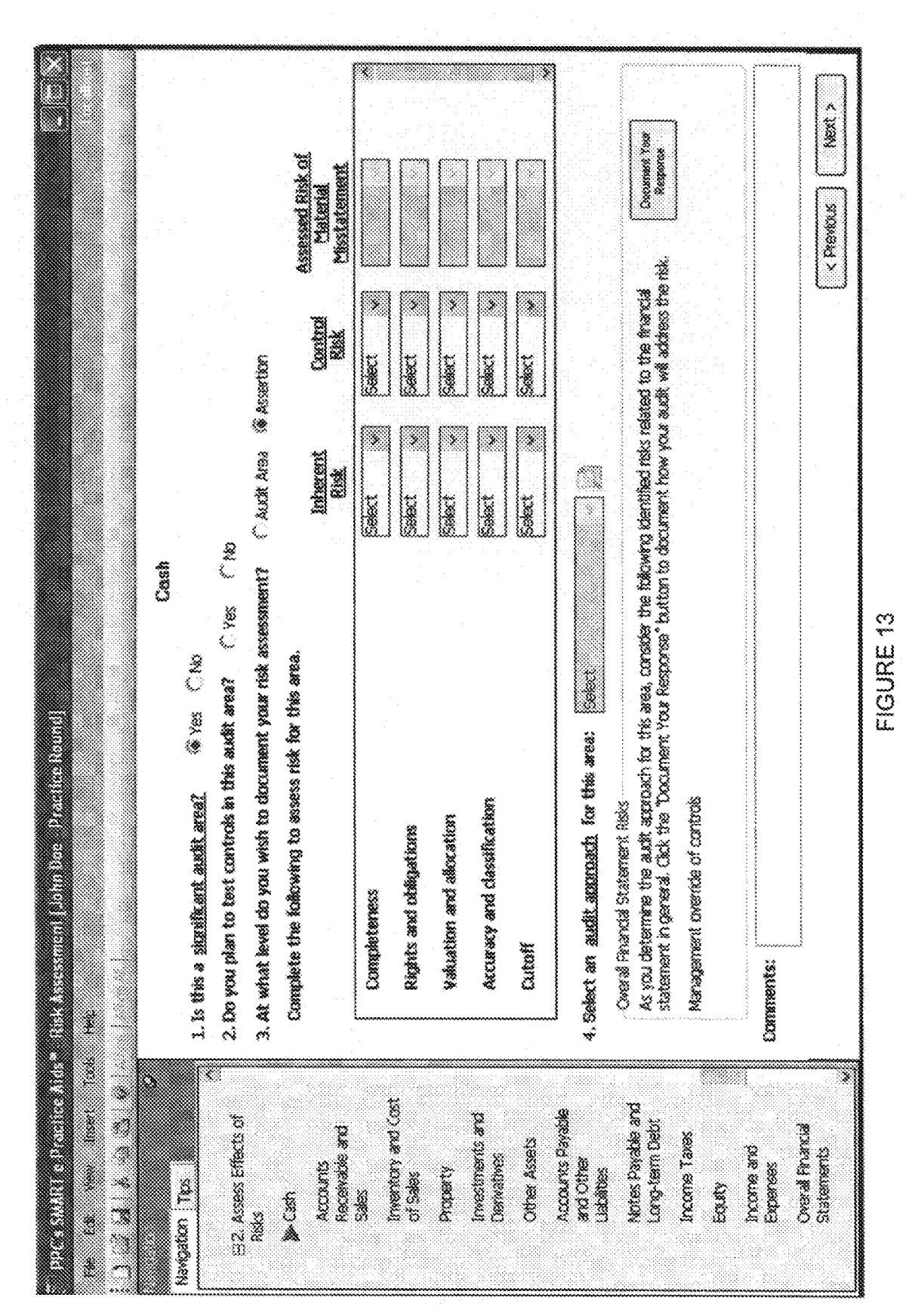

FIG. 13 depicts an initial risk assessment summary form. Risk assessment summary forms are the aspect of the present invention wherein users respond to predetermined questions with answers related to the risk of certain assertions. The presentation of identified risks and risk assessments in FIG. 13 may be referred to as the presenting step. Assertions are representations that are embodied in components being audited and include existence or occurrence, completeness, rights and obligations, valuation and allocation, accuracy and classification, and cutoff. There are three types of audit risk for which assertions must be made. The type of audit risks include inherent risk (IR), control risk (CR), and the assessed risk of material misstatement (RMM). The inherent risk is the susceptibility of a relevant assertion to a misstatement that could be material, either individually or when aggregated with other misstatements, assuming there are no related controls. The control risk is the risk that a misstatement that could occur in a relevant assertion and that could be material, either individually or when aggregated with other misstatements, will be not prevented or detected on a timely basis by the entity's internal control. The assessed RMM is the product of IR and CR and may be automatically calculated, but may be manually altered by the auditor. The risk levels inputted under IR, CR and RMM are of three levels, an example of which might be low, moderate and high, but is not limited to such terms.

As used herein, the term assertion means representations that are embodied in components being audited. For example, Statement on Auditing Standard No. 106, Audit Evidence (SAS No. 106), issued by the American Institute of Certified Public Accountants (AICPA), provides that assertions used by the auditor fall into the following categories:

a. Assertions about classes of transactions and events for the period under audit:
   i. Occurrence. Transactions and events that have been recorded have occurred and pertain to the entity.
   ii. Completeness. All transactions and events that should have been recorded have been recorded.

iii. Accuracy. Amounts and other data relating to recorded transactions and events have been recorded appropriately.
iv. Cutoff. Transactions and events have been recorded in the correct accounting period.
v. Classification. Transactions and events have been recorded in the proper accounts.
b. Assertions about account balances at the period end:
i. Existence. Assets, liabilities, and equity interests exist.
ii. Rights and obligations. The entity holds or controls the rights to assets, and liabilities are the obligations of the entity.
iii. Completeness. All assets, liabilities, and equity interests that should have been recorded have been recorded.
iv. Valuation and allocation. Assets, liabilities, and equity interests are included in the financial statements at appropriate amounts and any resulting valuation or allocation adjustments are appropriately recorded.
c. Assertions about presentation and disclosure:
i. Occurrence and rights and obligations. Disclosed events and transactions have occurred and pertain to the entity.
ii. Completeness. All disclosures that should have been included in the financial statements have been included.
iii. Classification and understandability. Financial information is appropriately presented and described and disclosures are clearly expressed.
iv. Accuracy and valuation. Financial and other information are disclosed fairly and at appropriate amounts.

SAS No. 106 provides that the auditor may use these relevant assertions as described above or may express them differently provided aspects described above have been covered. Standard setting bodies other than the AICPA also refer to other assertions in grouping that are similar to but that may differ from the grouping in SAS No. 106.

Assertions in the invention are summarized and presented in the following six groupings: existence or occurrence, completeness, rights and obligations, valuation and allocation, accuracy and classification, and cutoff.

FIG. 13 prompts the auditor to determine whether this audit area is a significant audit area 133. A significant audit area 133 is an audit area that contains a significant transaction class, a material account balance, requires significant disclosures, or contains a fraud risk or other significant risk.

Additionally, risks entered in FIG. 7 are displayed in the Risk Assessment Summary form of FIG. 13. These risks can be expanded by double-clicking the risk field. Only those risks that pertain to the audit area will appear in FIG. 13 for that audit area (e.g., a risk of fraud relating only to property will appear in FIG. 13 for that audit area (e.g., a risk of fraud property category and not the cash or any other category). A risk entered in FIG. 7 as a risk to the overall financial statements will appear in each category.

On FIG. 13 an auditor will then choose which audit approach to take. The present invention contemplates a variety of audit approaches including a limited procedures audit approach, a basic procedures audit approach and an extended procedures audit approach. Based upon the information inputted on the planning form, particularly the information inputted under the RMM, the risk assessment system will generate a suggested audit approach. In one manner of implementation, if any RMM assertion is high, an extended procedures audit will be suggested. Also, an alternative audit approach may be carried out by presenting and selecting an audit approach other than the suggested approach.

The limited audit approach consists of preliminary analytical procedures, other risk assessment procedures, and final analytical procedures considered sufficient. No audit program will be created for the audit area. This approach is not appropriate for significant audit areas. The basic audit approach is the audit that will be included in both the basic and extended audit reports. The basic procedures audit will include primarily substantive analytical procedures and certain tests of details required by auditing standards or regulations. This approach ordinarily is not appropriate to respond to a fraud risk or other significant risk. The extended procedures audit approach includes the basic procedures plus procedures for additional assurance related to assertions for which the auditor indicates there is a high RMM If there is a moderate RMM, extended procedures will be suggested if fraud or any other significant risks exist.

Risk Assessment Summary Forms exist for at least the categories cash, accounts receivables and sales, inventory and cost of sales, inventory observation, property, investments and derivatives, other assets, accounts payable and other liabilities, notes payable and long-term debt, income taxes, equity, and incomes and expenses, overall financial records, but is not limited to these categories.

Figure 14:
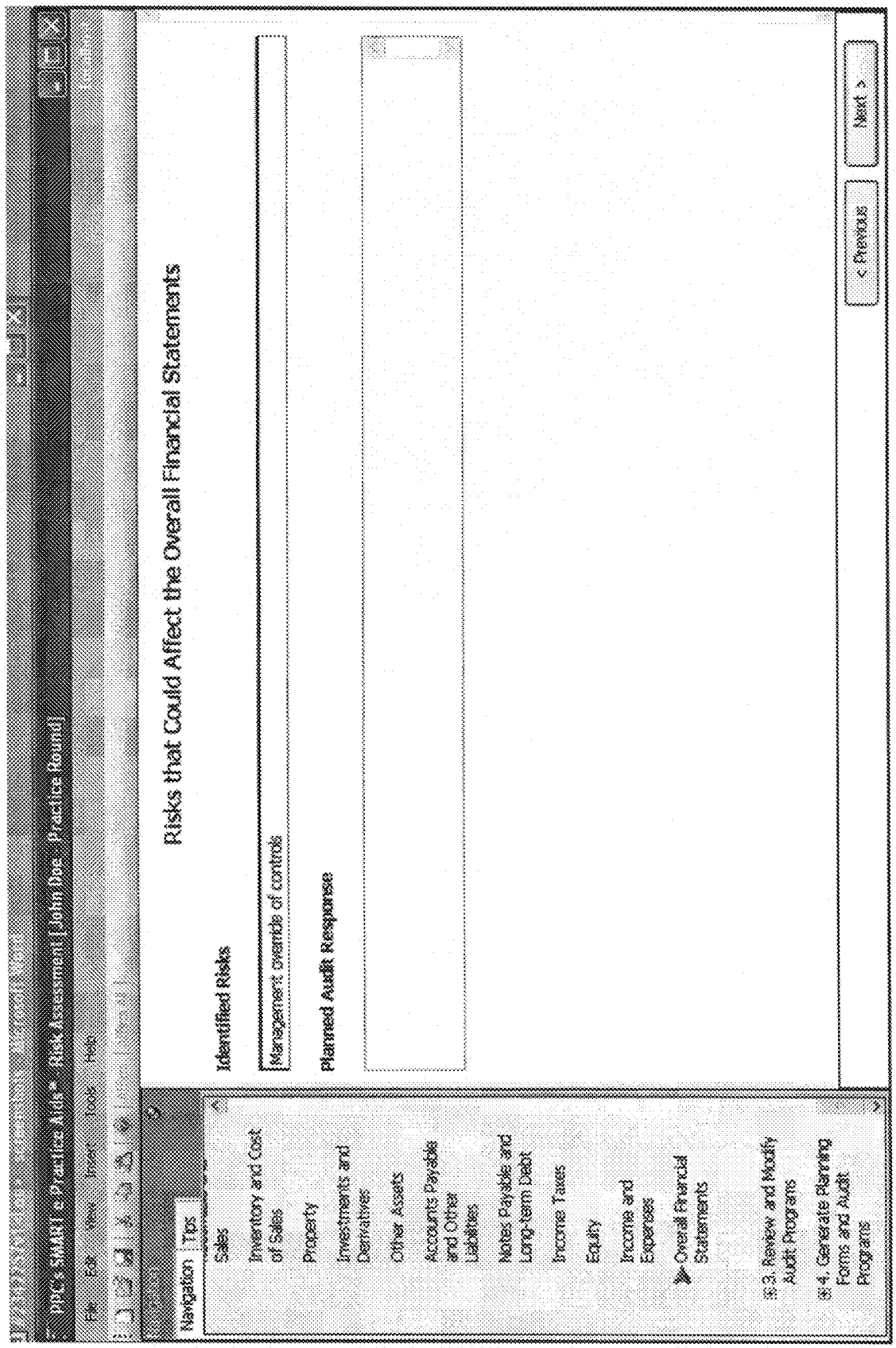
FIG. 14 depicts the risks entered in FIG. 7 that are identified as a risk to the overall finance statements.

FIG. 14 depicts the risks entered in FIG. 7 as risks to the overall finance statements. This screen permits an auditor to list procedures relating to that particular risk factor. Allowing for specifically inputted risks gives the auditor flexibility in designing an audit procedures.

Figure 15:
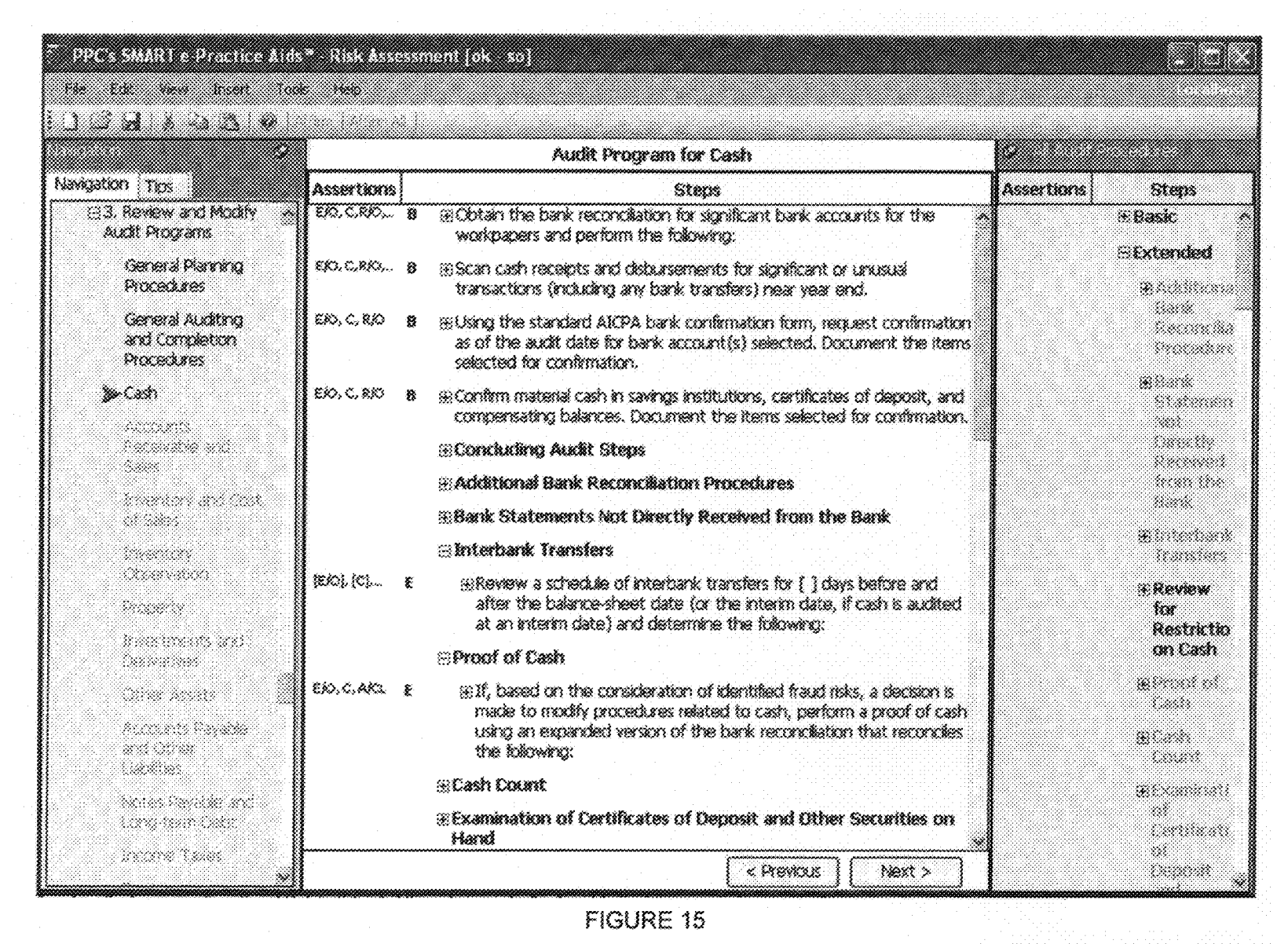

FIG. 15 depicts the procedures generated by inputted data. The risk assessment system of the invention generates procedures utilizing a logic scheme wherein answers or responses input by the auditor are used as input to the logic. The generation in this step is referred to as the automatically generating step. An auditor can alter the procedures as generated by the system. The procedures are displayed in a nested format using boxes an auditor may click to display the nested information. In the right pane, all available audit procedures are listed. This pane includes audit procedures included or excluded from the generated procedures in the center pane. Exclude procedures were excluded from the report because in response to the answers inputted the program deemed those procedures irrelevant. However, so that the auditor may have full control and ability to customize the report, the auditor may alter the procedures by dragging those procedures from the right pane into the list of procedures to perform in the center pane. Using drag and drop technology, the auditor is able to determine where in the center pane the new procedures is displayed. If an auditor wishes to change the location of the procedure within the center pane (both those automatically generated and those added by the auditor), the auditor can drag and drop that procedure into the right pane and that procedure will be removed. Further, the user can reorder the procedures in the report from this screen.

Figure 16:
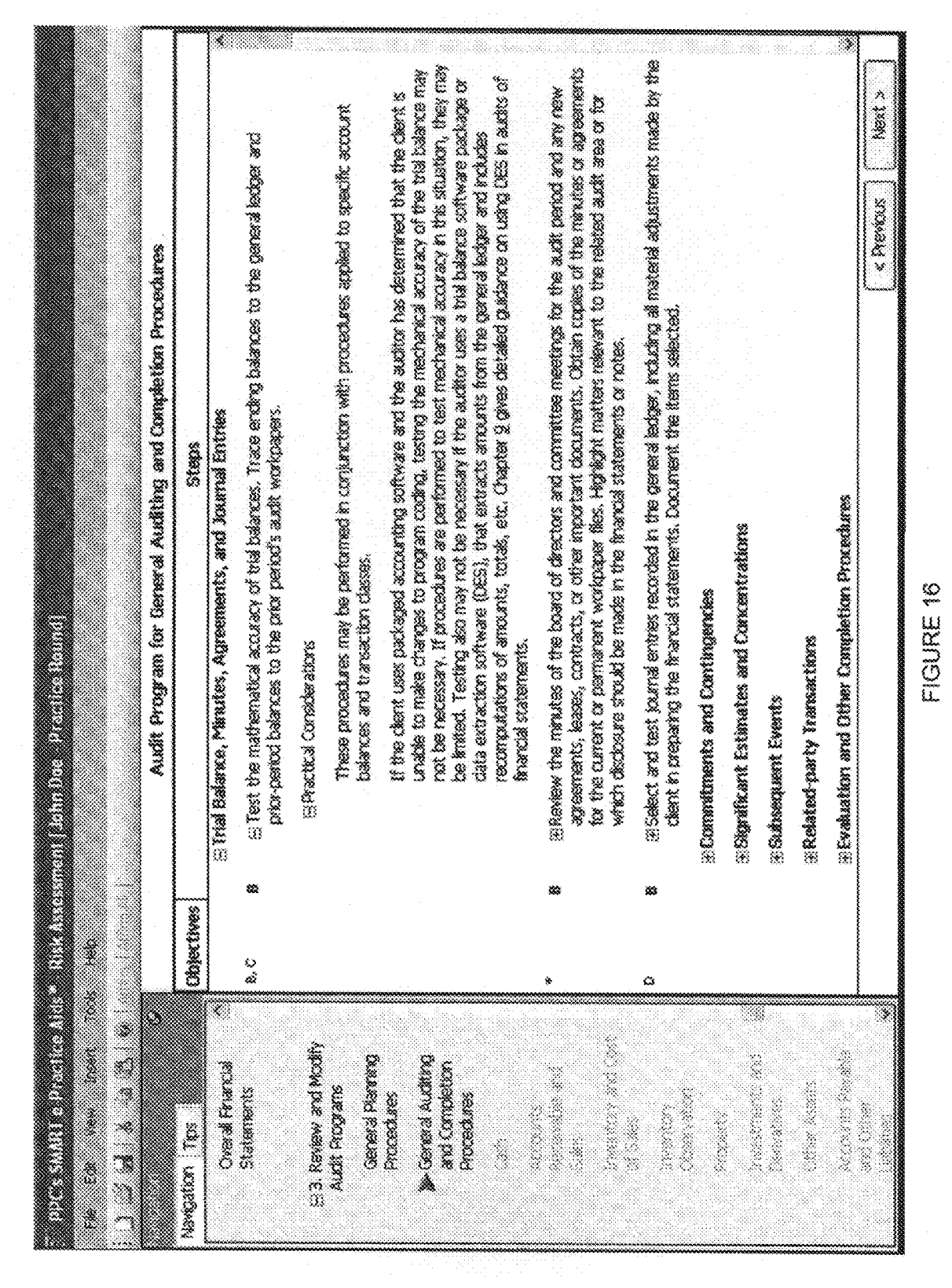

FIG. 16 depicts general procedures that are applicable to all audits. These procedures are displayed in the same structure as the steps of FIG. 15. Similar to FIG. 15, an auditor may drag and drop new procedures into place into the primary screen of FIG. 16. Likewise, the auditor may drag and drop procedures in FIG. 16 into the right pane to remove them from the audit report.

FIG. 17 depicts a diagnostic report. The diagnostic report of FIG. 17 lists potential errors as a result of information inputted by the auditor including failure to answer any portion of a planning form or failure to select an audit approach. This is especially useful because it alerts the auditor to issues that should be considered before documents are generated in FIGS. 18 and 21. To correct these errors, a user may either click through the left pane's navigation panel, or use the previous button.

Figure 18:
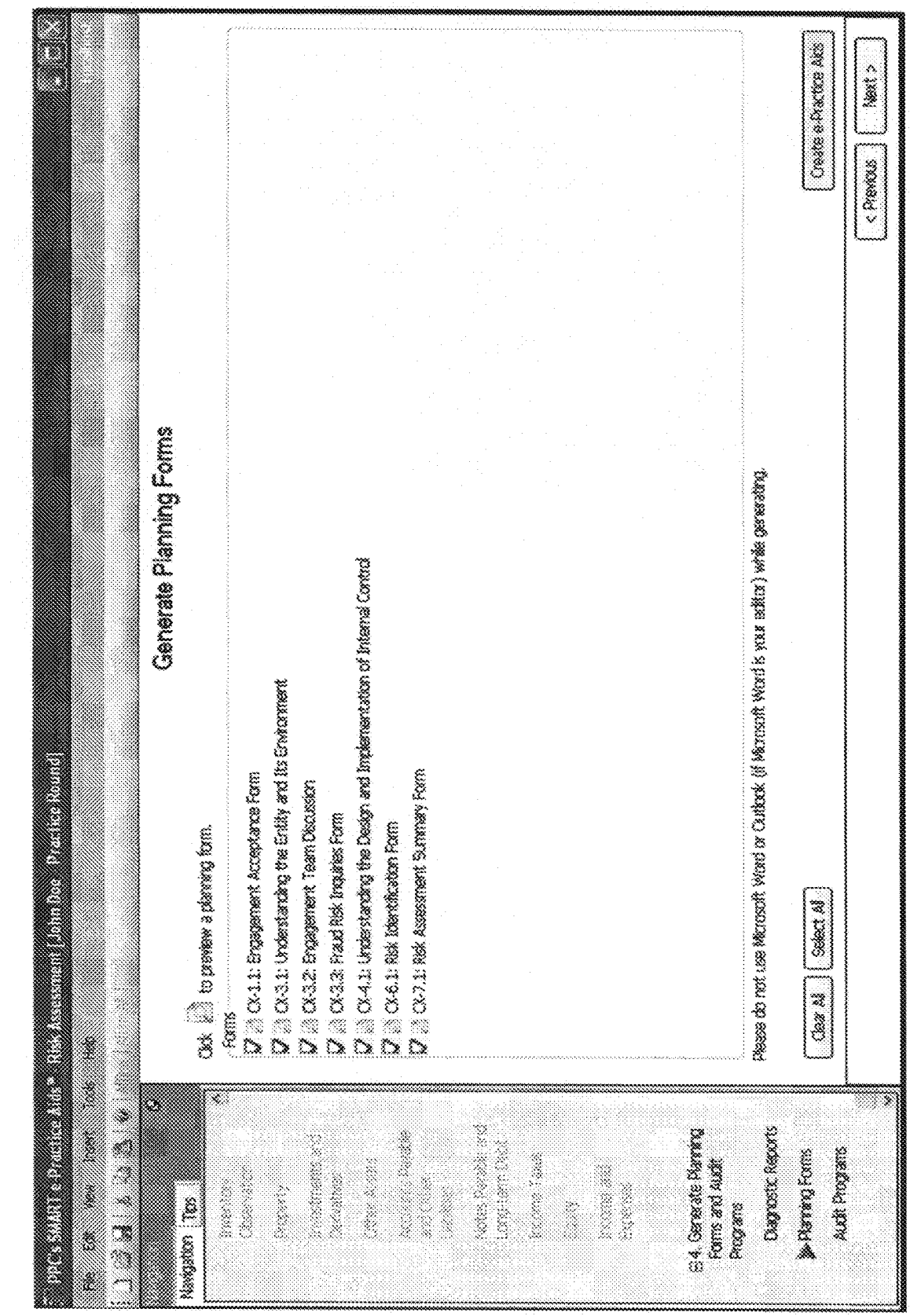
FIG. 18 depicts the generated audit form and related screen in keeping with the present invention.
Figure 20:
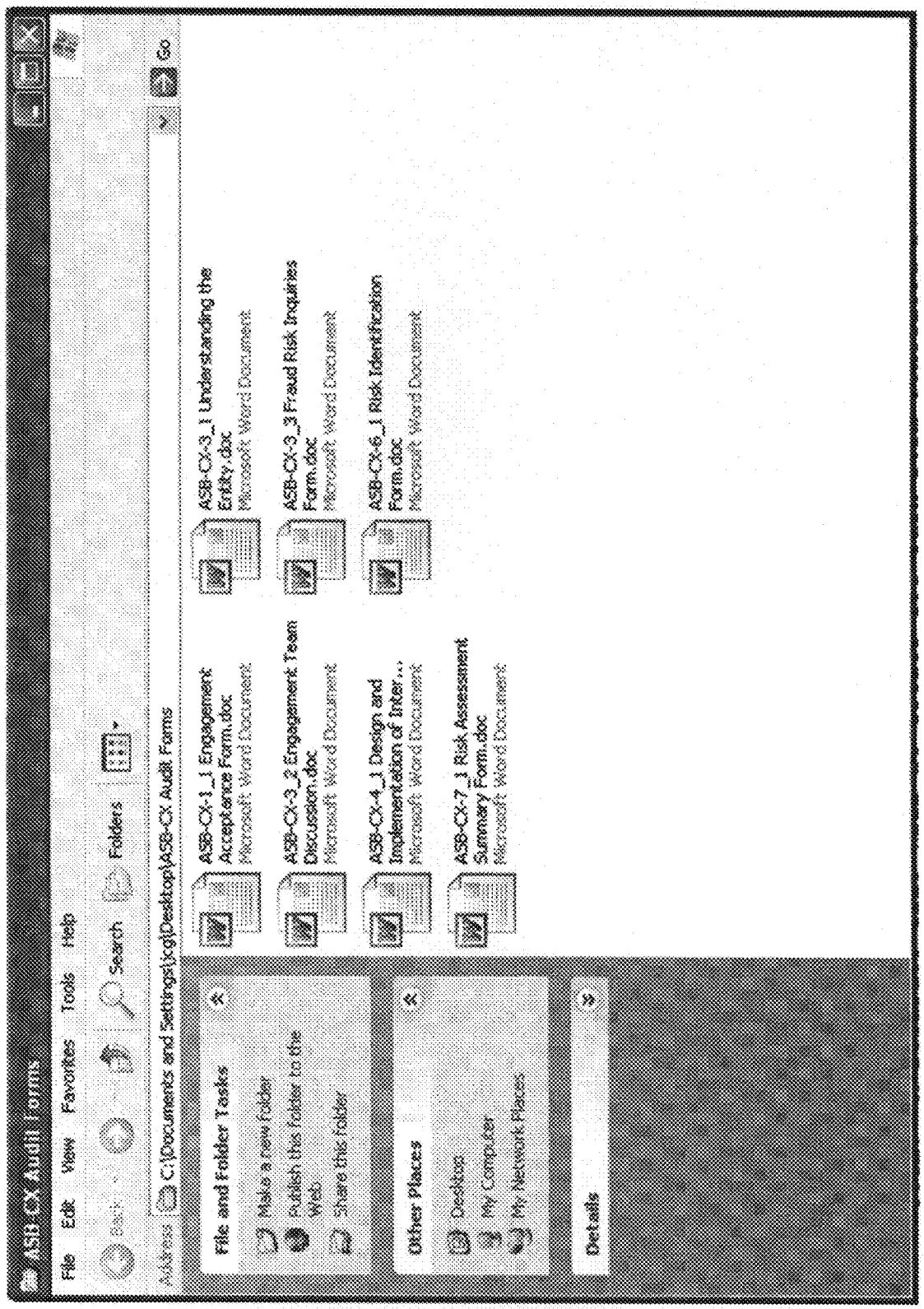
FIG. 20 depicts a file containing all forms generated by the program.

FIG. 18 depicts the generated audit forms. The audit forms correspond to the planning forms of FIGS. 6 and 8 through 13. An auditor may click on any of the forms to download a preview of the actual form. Alternatively, an auditor may click "Create e-Practice Aids" to generate audit documents as shown in FIG. 20.

FIG. 19 depicts a preview of an audit form generated by the system. Software. The preview report generated allows the user to view the form before exiting the program. By creating the preview function, an auditor can review the form to ensure that all elements needed are present. Because of the easy navigation through the program using either the left pane or the "previous" button, an auditor can easily amend the form using the system software. The preview report appears just as the actual form will appear when printed. The preview mode does not display the practical considerations feature.

From FIG. 18, pressing the Create e-Practice Aids button will prompt a user to input a location to save the audit report forms. An auditor may choose which report forms to create by selecting or deselecting the check box next to the form. A separate file will be created for each form generated by the software. FIG. 20 depicts a folder containing all forms generated by the program.

Figure 21:
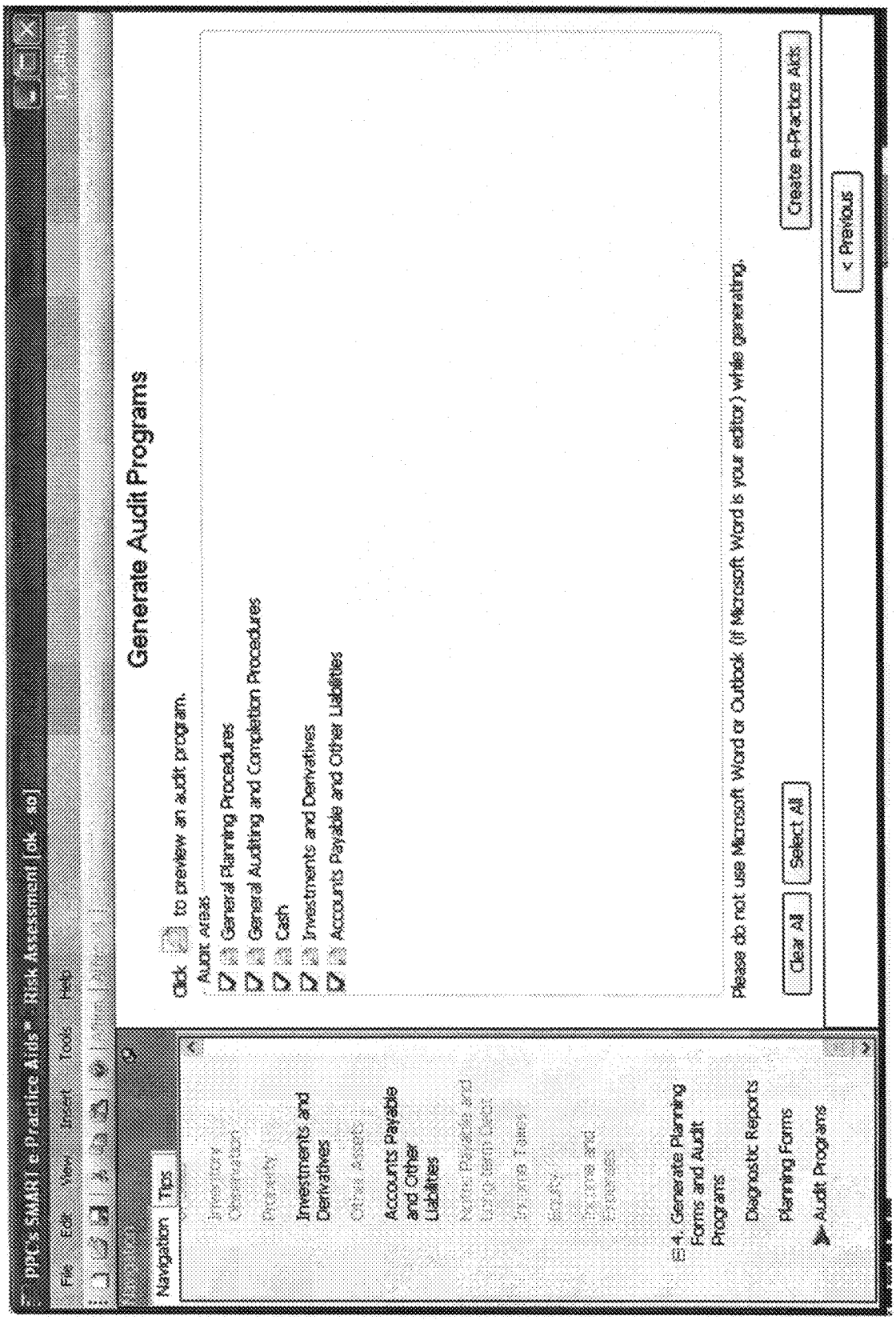
FIG. 21 depicts an exemplary Generate Audit Programs screen in keeping with the present invention.

FIG. 21 depicts the Generate Audit Programs screen. From here as in FIG. 18, an auditor may preview the audit programs and create the programs by selecting the Create e-Practice Aids button.

Figure 22:
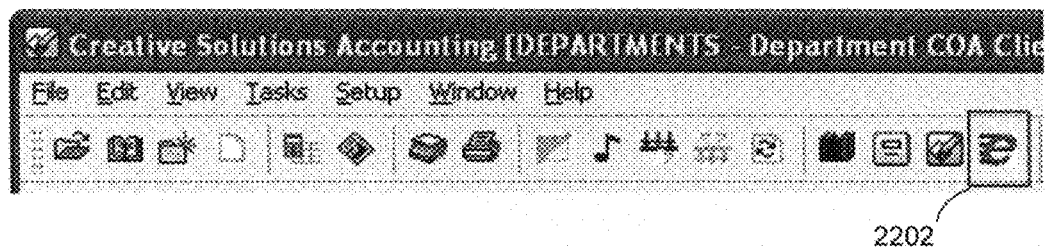
FIG. 22 depicts an exemplary toolbar associated with an engagement solution for providing an efficient tool to standardize procedures in tax and accounting applications.
Figure 23:
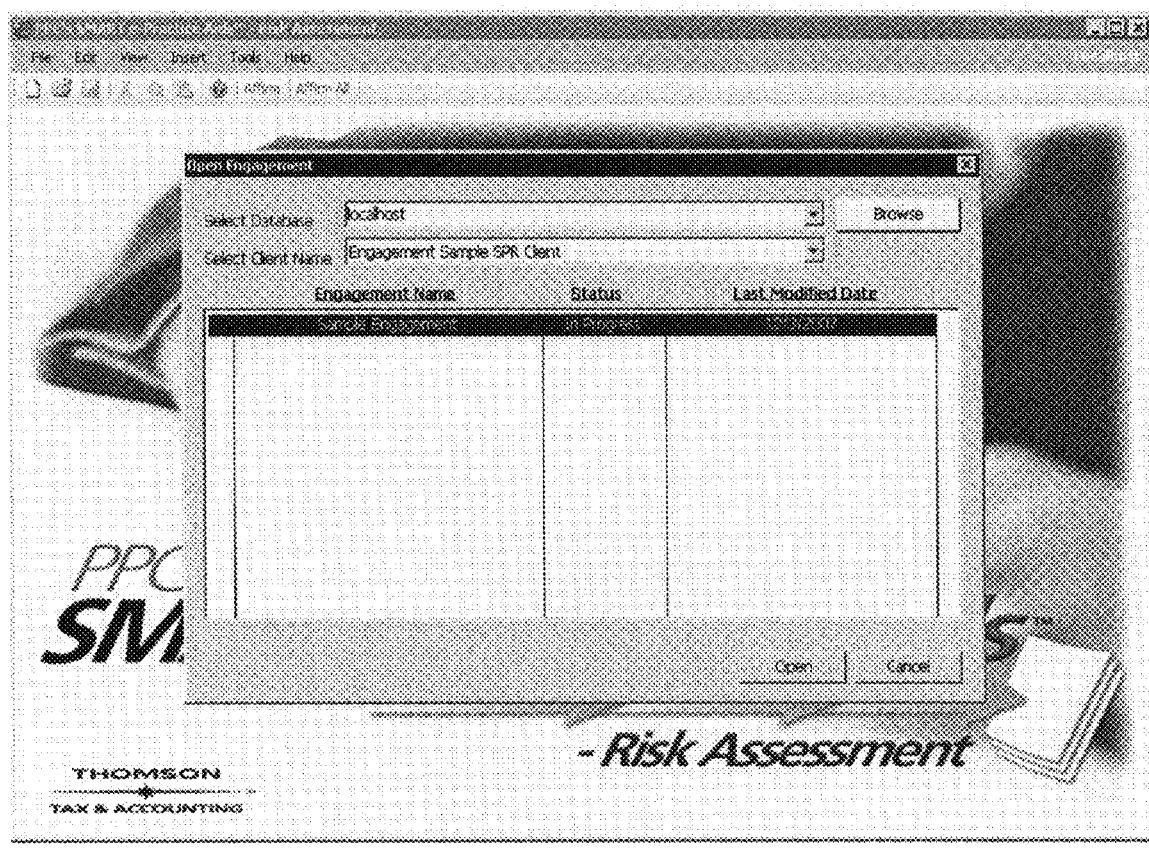
FIG. 23 depicts an exemplary screen with a default client engagement window in keeping with the present invention.

FIGS. 22-26 are directed to illustrating an implementation of an engagement document placement system to assist entities and professionals in carrying out tax and accounting functions, such as audits, internal controls, financial statements and reporting, and risk assessment. FIG. 22 illustrates a toolbar associated with an engagement solution, such as Thomson Engagement CS™ solution, for providing an efficient tool to standardize procedures in tax and accounting applications. The engagement solution is integrated with, for example, a risk assessment solution and other tax and accounting tools, such as Thomson SMART e-Practice™ Aids, e-Tools™, e-Workpapers™, and Checkpoint® solutions, thereby marrying guidance and research products and tools to provide a comprehensive engagement workflow management system. The engagement solution also integrates, for example, with Microsoft Word® and Excel® products for data and document processing in creating and editing and accessing work-product associated with engagements. As shown in FIG. 22, a user activates button 2202 to launch or access a tax and accounting solution, such as SMART e-Practice™ Aids, which is illustrated as opening in FIG. 23. FIG. 23 represents an exemplary screen with a default client engagement window. The user may then activate the "open" button to gain access to the in progress "Sample Engagement" engagement.

Figure 24:
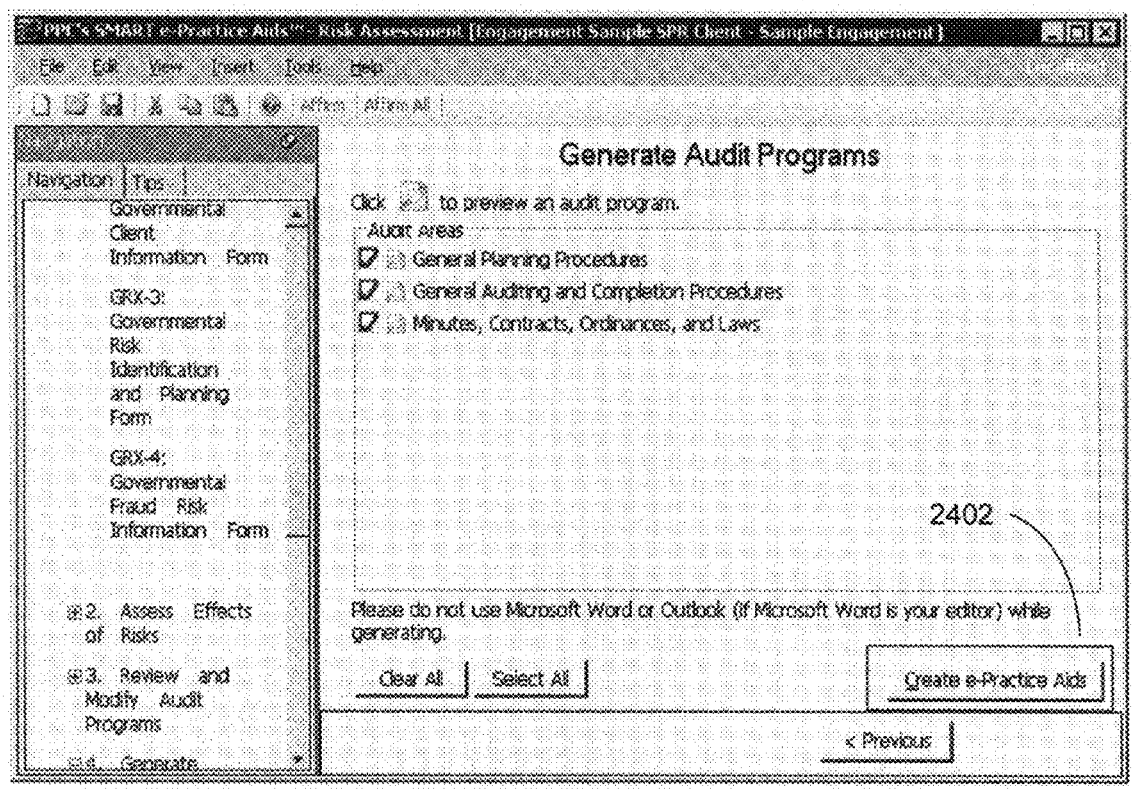
FIG. 24 depicts a General Audit Programs screen in keeping with the present invention.
Figure 25:
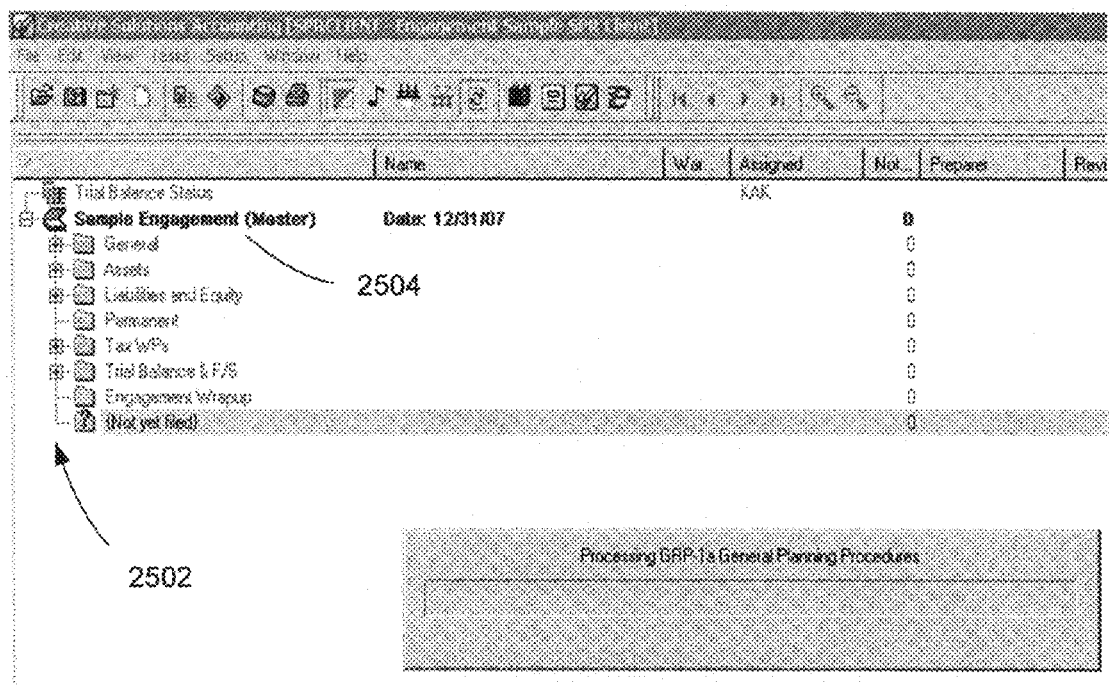
FIG. 25 depicts a screenshot of an exemplary engagement document placement folder arrangement associated with the particular engagement in keeping with the present invention.
Figure 26:
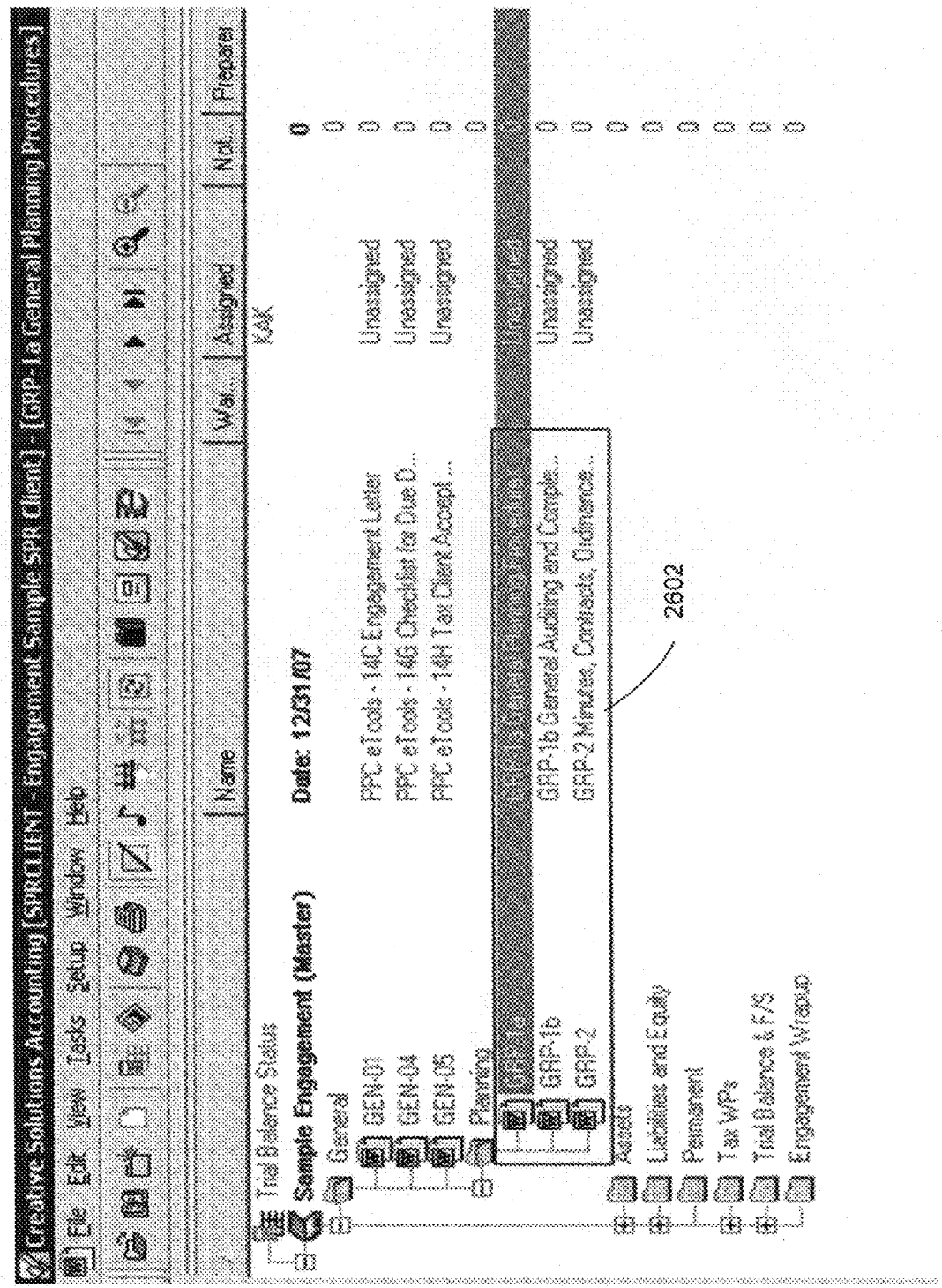
FIG. 26 depicts a screenshot of the generated documents as filed in the appropriate places in keeping with the present invention.

FIG. 24 shows a General Audit Programs screen, similar to that described above and shown in FIG. 21. From this screen, a user may select Audit areas of interest and work completed in the risk assessment solution of this example to generate programs and planning forms. As shown, the user activates the "Create e-Practice Aids" button 2402. From the screen of FIG. 24, pressing the Create e-Practice Aids button will cause the engagement document placement solution to automatically process the risk assessment generated documents and to electronically file the generated documents in the appropriate folder within the auditing system. Existing documents are replaced when required. FIG. 25 is a screenshot of an exemplary engagement document placement folder arrangement associated with the particular engagement, e.g., "Sample Engagement (Master)." FIG. 26 represents a screenshot depicting the generated documents 2602, such as planning procedures documents, as filed in the appropriate places, i.e. folders and subfolders, in this instance "Planning" folder. From FIG. 26, a user, e.g., an auditor, is able to open and use the relevant generated documents in performing completing the engagement, e.g., an audit.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A computer-implemented method for automatically generating and grouping documents associated with a tax and accounting related engagement, the method comprising:
  (a) presenting by a display a plurality of financial audit items for verifying recorded financial items and a set of risk levels associated with the plurality of financial audit items;
  (b) receiving and processing by a processor a set of responses to the presenting step;
  (c) automatically generating by the processor a financial audit approach set for verifying recorded financial items based at least in part on the set of responses as received and processed in the receiving and processing step, the financial audit approach set including a suggested financial audit approach and an alternative financial audit approach;
  (d) presenting for selection at least one financial audit approach from the financial audit approach set;
  (e) automatically generating by the processor documents related to verifying recorded financial items and associated with a selected financial audit approach; and
  (f) automatically grouping by the processor the automatically generated documents into one or more sets of documents irrespective of a physical location of said documents, wherein the one or more sets of documents are presented by the display.

2. The method of claim 1 wherein the selected financial audit approach includes a set of at least one financial audit programs.

3. The method of claim 2 wherein the set of at least one financial audit programs includes a set of procedures based at least in part on the selected financial audit approach.

4. The method of claim 1 wherein the set of risk levels are associated with a set of assertions associated with the plurality of financial audit items.

5. The method of claim 1 wherein the automatically generating a financial audit approach set step comprises determining a set of procedures based at least in part on the set of responses and wherein the selected financial audit approach includes presenting the set of procedures.

6. The method of claim 1 further comprising editing the determined set of procedures from the generating step to result in a customized set of procedures.

7. The method of claim 1 further comprising presenting a set of electronic documents associated with the selected financial audit approach.

8. The method of claim 1 wherein the method is at least in part carried out using an Internet-based application or is Internet-enabled.

9. The method of claim 1 wherein the method is at least in part carried out using a desktop application.

10. A system adapted to automatically generate and group documents associated with a tax and accounting related engagement, the system comprising:
   (a) a computer having an associated memory, display, and input device and adapted to execute code;
   (b) a graphical user interface adapted to operate on the computer and adapted to present a plurality of financial audit items for verifying recorded financial items and a set of risk levels associated with the plurality of financial audit items and adapted to receive a set of responses by the input device;
   (c) a response code set adapted to be executed on the computer and adapted to receive and process the set of responses;
   (d) an audit code set adapted to be executed by the computer and adapted to automatically generate a financial audit approach set for verifying recorded financial items based at least in part on the set of responses, the financial audit approach set including a suggested financial audit approach and an alternative financial audit approach;
   (e) a code set adapted to be executed on the computer and adapted to present for selection at least one financial audit approach from the financial audit approach set;
   (f) a document generation code set adapted to be executed on the computer and to automatically generate documents related to verifying recorded financial items and associated with a selected financial audit approach; and
   (g) a document placement code set adapted to be executed on the computer and to automatically group the automatically generated documents into one or more sets of documents irrespective of a physical location of said documents.

11. The system of claim 10 wherein the audit code set is further adapted to present by the graphical user interface a set of procedures based at least in part on the selected financial audit approach.

12. The system of claim 10 wherein the audit code set is further adapted to determine a set of procedures based at least in part on the set of responses.

13. The system of claim 10 wherein the audit code set is further adapted to present a set of electronic documents associated with the selected financial audit approach.

14. The system of claim 10 wherein at least some of the code executed by the computer is Internet-based or Internet-enabled.

15. The system of claim 10 wherein at least some of the code executed by the computer is a desktop application.

16. A computer program for automatically generating and grouping documents associated with a tax and accounting related engagement, and embodied in a non-transitory computer-readable medium configured for execution on a computer having an associated memory, display, and input device, the computer program comprising:
   (a) a graphical user interface adapted to operate on the computer and adapted to present a plurality of financial audit items for verifying recorded financial items and a set of risk levels associated with the plurality of financial audit items and adapted to receive a set of responses by the input device;
   (b) a response code set adapted to be executed on the computer and adapted to receive and process the set of responses;
   (c) an audit code set adapted to be executed by the computer and adapted to automatically generate a financial audit approach set for verifying recorded financial items based at least in part on the set of responses, the financial audit approach set including a suggested financial audit approach and an alternative financial audit approach;
   (d) a code set adapted to be executed by the computer and adapted to present for selection at least one financial audit approach from the financial audit approach set;
   (e) a document generation code set adapted to be executed on the computer and to automatically generate documents related to verifying recorded financial items and associated with a selected financial audit approach; and
   (f) a document placement code set adapted to be executed on the computer and to automatically group the automatically generated documents into one or more sets of documents irrespective of a physical location of said documents.

17. The method of claim 16, wherein the selected financial audit approach includes a set of at least one financial audit programs.

18. The method of claim 17, wherein the set of at least one financial audit programs includes a set of procedures based at least in part on the selected financial audit approach.

19. The computer program of claim 16, wherein the graphical user interface is adapted to present a set of prompts designed to elicit the set of responses, the set of responses being associated with a set of risks associated with a financial audit.

20. The computer program of claim 16, wherein the audit code set is further adapted to present by the graphical user interface a set of procedures based at least in part on the selected financial audit approach.

* * * * *